United States Patent
Subbarayan et al.

(10) Patent No.: US 11,962,140 B2
(45) Date of Patent: Apr. 16, 2024

(54) COORDINATION OF PROTECTIVE ELEMENTS IN AN ELECTRIC POWER SYSTEM

(71) Applicant: Schweitzer Engineering Laboratories, Inc., Pullman, WA (US)

(72) Inventors: Jai Ganesh Subbarayan, Flowood, MS (US); Jeremy William Blair, Jackson, MS (US); Brett Mitchell Cockerham, Charlotte, NC (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 439 days.

(21) Appl. No.: 17/452,096

(22) Filed: Oct. 25, 2021

(65) Prior Publication Data

US 2023/0129666 A1 Apr. 27, 2023

(51) Int. Cl.
| | |
|---|---|
| *H02H 3/00* | (2006.01) |
| *H02H 1/00* | (2006.01) |
| *H02H 3/033* | (2006.01) |
| *H02H 3/08* | (2006.01) |
| *H02H 3/20* | (2006.01) |

(52) U.S. Cl.
CPC .......... *H02H 3/033* (2013.01); *H02H 1/0007* (2013.01); *H02H 3/08* (2013.01); *H02H 3/20* (2013.01)

(58) Field of Classification Search
CPC .......... H02H 3/033; H02H 3/08; H02H 3/20; H02H 1/0007
USPC ........................................................ 361/59
See application file for complete search history.

(56) References Cited

U.S. PATENT DOCUMENTS

| | | | |
|---|---|---|---|
| 4,321,681 A | * | 3/1982 | Sackin ..................... H02H 3/40 361/79 |
| 5,160,926 A | | 11/1992 | Schweitzer |
| 5,680,324 A | | 10/1997 | Schweitzer et al. |

(Continued)

FOREIGN PATENT DOCUMENTS

WO 2013017363 A1 2/2013

OTHER PUBLICATIONS

Carl B. Hauser, David E. Bakken, Anjan Bose, A Failure to Communicate, IEEE Power and Energy Magazine, Mar./Apr. 2005.

(Continued)

*Primary Examiner* — Jared Fureman
*Assistant Examiner* — Lucy M Thomas
(74) *Attorney, Agent, or Firm* — Jared L. Cherry

(57) ABSTRACT

The present disclosure relates to systems and methods to coordinate protective elements in an electric power system (EPS). In one embodiment, a system may include a Time vs Normalized Impedance Length subsystem to determine a first plurality of times of operation of a first protective element for a plurality of fault locations in the EPS and to determine a second plurality of times of operation of a second protective element for the plurality of fault locations in the EPS. A protective action subsystem may coordinate a response of the first protective element and the second protective element. The protective action subsystem may establish a pickup and a protective action for the second protective element. Upon detection of a fault in the EPS, one of the first protective action and the second protective action may be implemented based on one of the first pickup and the second pickup.

20 Claims, 15 Drawing Sheets

(56) References Cited

U.S. PATENT DOCUMENTS

| | | | |
|---|---|---|---|
| 5,793,750 A | 8/1998 | Schweitzer et al. | |
| 6,121,886 A | 9/2000 | Andersen | |
| 6,380,949 B2 | 4/2002 | Thomas et al. | |
| 6,388,901 B2 | 5/2002 | Sato | |
| 6,662,124 B2 | 12/2003 | Schweitzer et al. | |
| 6,671,635 B1 | 12/2003 | Forth et al. | |
| 6,757,282 B1 | 6/2004 | Ofek | |
| 6,795,789 B2 | 9/2004 | Vandiver | |
| 6,871,224 B1 | 3/2005 | Chu et al. | |
| 6,944,555 B2 | 9/2005 | Blackett et al. | |
| 6,947,269 B2 | 9/2005 | Lee et al. | |
| 6,957,158 B1 | 10/2005 | Hancock et al. | |
| 6,961,641 B1 | 11/2005 | Forth et al. | |
| 6,990,395 B2 | 1/2006 | Ransom et al. | |
| 7,080,142 B2 | 7/2006 | Galloway et al. | |
| 7,174,258 B2 | 2/2007 | Hart | |
| 7,188,003 B2 | 3/2007 | Ransom et al. | |
| 7,231,003 B2 | 6/2007 | Lee | |
| 7,415,368 B2 | 8/2008 | Gilbert et al. | |
| 7,415,725 B2 | 8/2008 | Henneberry et al. | |
| 7,421,531 B2 | 9/2008 | Rotvold et al. | |
| 7,447,760 B2 | 11/2008 | Forth et al. | |
| 7,457,872 B2 | 11/2008 | Aton et al. | |
| 7,460,347 B2 | 12/2008 | Schweitzer et al. | |
| 7,460,590 B2 | 12/2008 | Lee | |
| 7,463,467 B2 | 12/2008 | Lee et al. | |
| 7,666,004 B2 | 2/2010 | Johnson et al. | |
| 7,693,607 B2 | 4/2010 | Kasztenny et al. | |
| 7,870,595 B2 | 1/2011 | Finney et al. | |
| 7,899,619 B2 | 3/2011 | Petras | |
| 7,987,059 B2 | 7/2011 | Gong et al. | |
| 8,082,367 B2 | 12/2011 | Etheridge et al. | |
| 8,260,579 B2 | 9/2012 | Bickel et al. | |
| 9,383,735 B2 | 7/2016 | Schweitzer | |
| 10,955,456 B2* | 3/2021 | Becher | G06N 20/00 |
| 2001/0022734 A1 | 9/2001 | Sato | |
| 2002/0173927 A1 | 11/2002 | Vandiver | |
| 2004/0138834 A1 | 7/2004 | Blackett et al. | |
| 2004/0138835 A1 | 7/2004 | Ransom et al. | |
| 2004/0193329 A1 | 9/2004 | Ransom et al. | |
| 2005/0138111 A1 | 6/2005 | Aton et al. | |
| 2005/0138432 A1 | 6/2005 | Ransom et al. | |
| 2005/0144437 A1 | 6/2005 | Ransom et al. | |
| 2005/0280965 A1 | 12/2005 | Lee et al. | |
| 2006/0155908 A1 | 7/2006 | Rotvold et al. | |
| 2006/0230394 A1 | 10/2006 | Forth et al. | |
| 2007/0096765 A1 | 5/2007 | Kagan | |
| 2007/0133724 A1 | 6/2007 | Mazereeuw et al. | |
| 2008/0052435 A1 | 2/2008 | Norwood et al. | |
| 2008/0075019 A1 | 3/2008 | Petras | |
| 2008/0162930 A1 | 7/2008 | Finney et al. | |
| 2009/0254655 A1 | 10/2009 | Kidwell et al. | |
| 2010/0013632 A1 | 1/2010 | Salewske et al. | |
| 2011/0035065 A1 | 2/2011 | Schweitzer et al. | |
| 2011/0066301 A1 | 3/2011 | Donolo | |
| 2011/0125339 A1* | 5/2011 | Bright | H02H 7/28 700/293 |
| 2011/0282508 A1 | 11/2011 | Goutard et al. | |
| 2012/0226386 A1 | 9/2012 | Kulathu et al. | |
| 2013/0035800 A1 | 2/2013 | Kulathu et al. | |
| 2014/0100702 A1 | 4/2014 | Schweitzer | |

OTHER PUBLICATIONS

Edmund O. Schweitzer, III, David E. Whitehead, Real-Time Power System Control Using Synchrophasors, Sep. 11, 2007.

Edmund O. Schweitzer, III, David E. Whitehead, Real-World Synchrophasor Solutions, Sep. 17, 2008.

John C. Eidson, John Tengdin, IEEE-1588 Standard for a Precision Clock Synchronization Protocol for a Networked Measurement and Control System and Applications in the Power Industry, 2003.

M. Kezunovic, G. Latisko, Automated Monitoring Functions for Improved Power System Operation and Control, IEEE, 2005.

Scadaworks, SCADA System Development Tools, Technical Reference Manual, 2003.

W.J. Ackerman, The Impact of IEDs on the Design of Systems Used for Operation and Control of Power Systems, Power System Management and Control, Apr. 17-19, 2002.

Wobshal, Network Sensors for the Smart Grid, Sensors Expo, 2010.

* cited by examiner

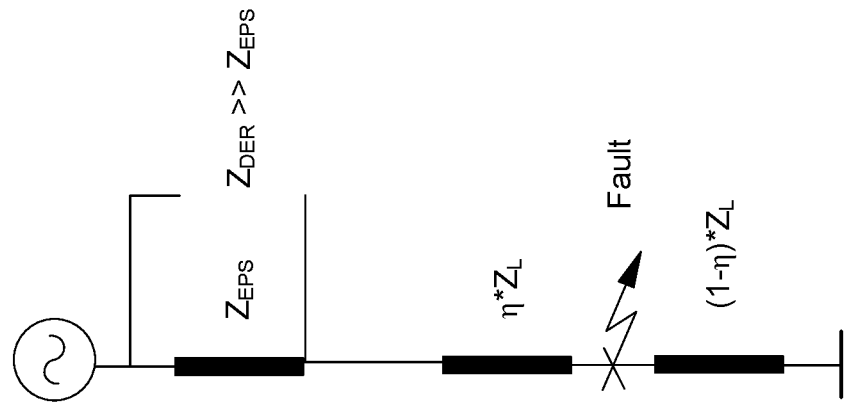
Figure 1D
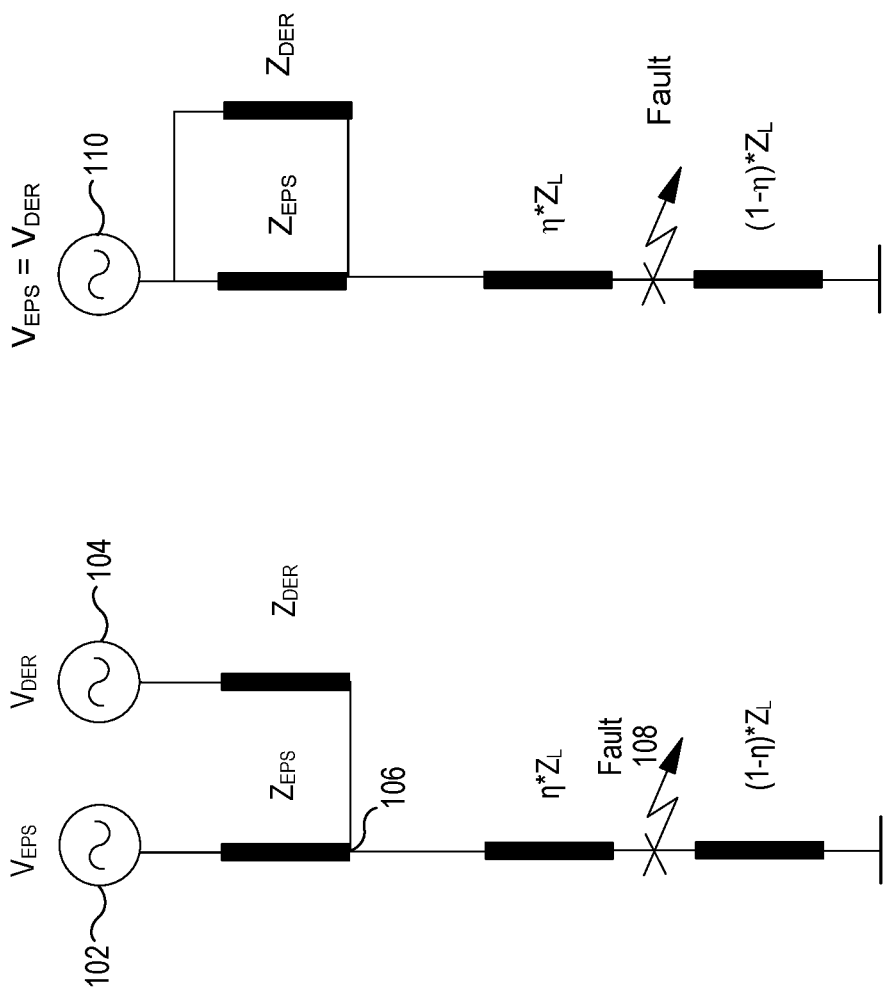
Figure 1C
Figure 1B

SLG Fault on Line 2 Topology A

SLG Fault on Line 1 Topology A

LLG Fault on Line 2 Topology A

LLG Fault on Line 1 Topology A

LLG Fault on Line 2 Topology B

COORDINATION OF PROTECTIVE ELEMENTS IN AN ELECTRIC POWER SYSTEM

TECHNICAL FIELD

The present disclosure pertains to coordination of protective devices in an Electric Power System (EPS). More particularly, but not exclusively, the present disclosure relates to the use of inverse time-undervoltage and inverse time-overvoltage characteristics in Point of Common Coupling (PCC) protection schemes to detect distribution feeder faults and to determine whether the associated Distributed Energy Resource (DER) should be isolated from the feeder in an EPS.

BRIEF DESCRIPTION OF THE DRAWINGS

Non-limiting and non-exhaustive embodiments of the disclosure are described, including various embodiments of the disclosure, with reference to the figures, in which:

FIG. 1B illustrates a model of the simplified EPS illustrated in FIG. 1A, which including a distribution feeder supplied by a conventional source and a DER consistent with embodiments of the present disclosure.

FIG. 1C represents a simplification of the circuit of FIG. 1B, in which the conventional source and the DER are replaced by a Thevenin equivalent source.

FIG. 1D represents a further simplification of the circuit model shown in FIG. 1C reflecting that $Z_{DER}$ is much larger than $Z_{SRC}$.

DETAILED DESCRIPTION

Figure 1A:
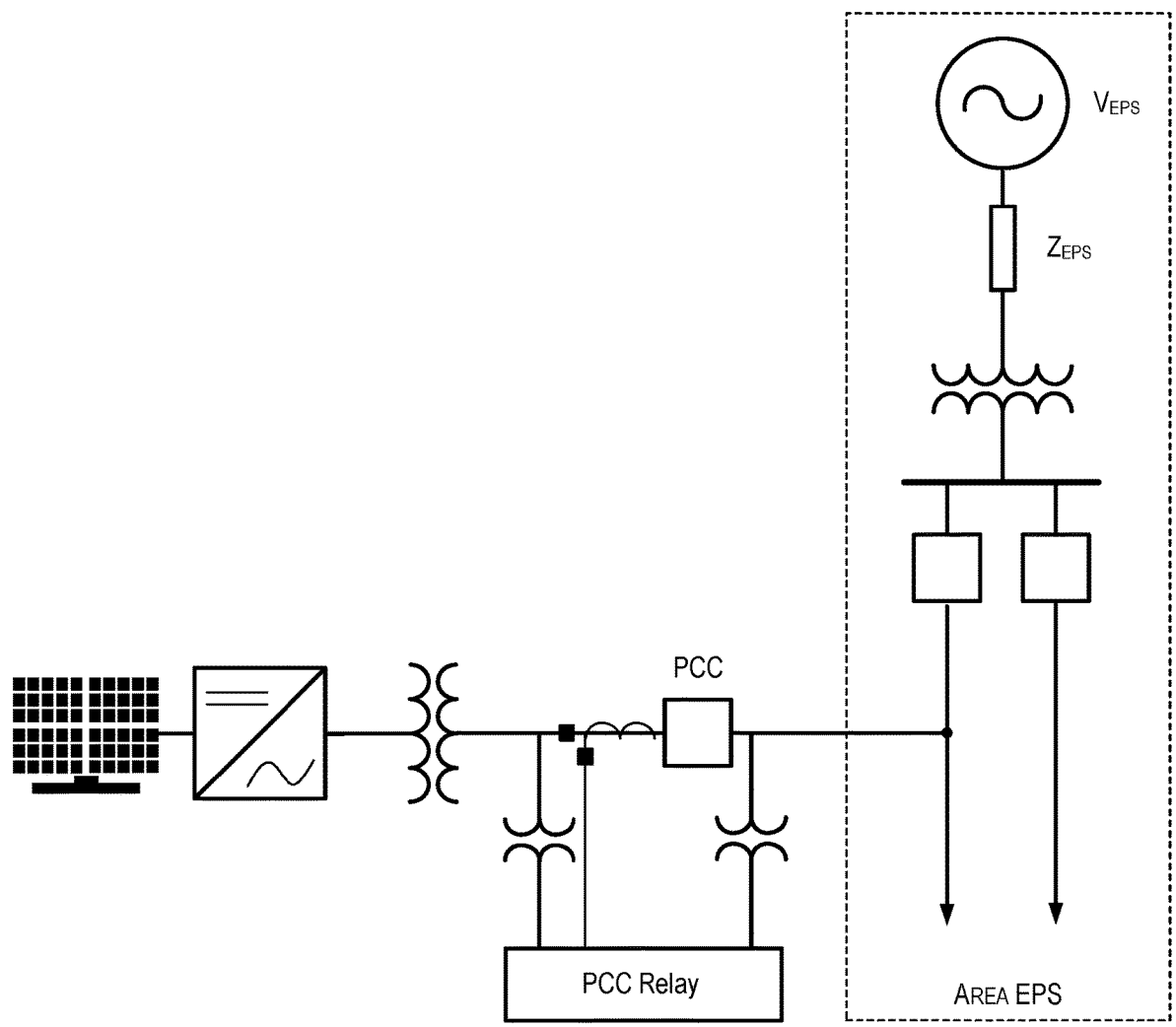
FIG. 1A illustrates a simplified EPS including a distribution feeder supplied by a conventional source and a DER consistent with embodiments of the present disclosure.

Relays may be used to monitor, automate, and protect equipment in EPSs. Relays may detect and remedy abnormal or dangerous conditions through protective actions, such as tripping. Where there are two relays or other protective devices between a fault point and the power supply, these devices must be coordinated to ensure that the device nearest the fault point will operate first. Clearing a fault using the nearest device minimizes the impact of the protective action. If the action of the nearest device fails to clear the fault, protective actions may be implemented by backup devices, but such actions may disrupt service to more customers. The action of other upstream devices is backup protection, which is coordinated with the primary protective device action using variable time-delays. This time-based coordination can be achieved using inverse-time protection elements, which have an inverse-square relationship with the operating quantity (e.g., current or voltage).

Relays may also incorporate multiple protection elements, and these elements can similarly be coordinated to operate in response to different types of faults. American National Standards Institute (ANSI) standard device numbers may be used herein to refer to specific protective devices used to protect electrical systems and components from damage when an unwanted event occurs, such as an electrical fault. One physical device may correspond to one function number, or a single physical device may have many protection elements associated with it. Suffix and prefix letters may be added to further specify the purpose and function of a device. For example, a relay may include Inverse Minimum Line to Neutral Time-Undervoltage Element (27ILN), an Inverse Ground Time-Overvoltage Element (59GI), and an Inverse Negative Sequence Time-Overvoltage Element (59QI). The 27ILN element will operate faster as the voltage dips lower, the 59GI element will operate faster as the zero-sequence voltage goes higher, and the 59QI element will operate faster as the negative-sequence voltage goes higher.

With the extensive use of Distributed Energy Resources (DER) and Inverter-Based Resources, protection of electric power systems with overcurrent based protection elements has become increasingly difficult. Consistent with the present disclosure, inverse-time overvoltage and inverse-time undervoltage protection elements may be utilized to provide fast, sensitive, selective and reliable protection at the Point of Common Coupling (PCC) between electric power system and the DER. Any such inverse-time voltage based element will have to be time-coordinated with existing overcurrent protection devices because the area electric power system incorporates overcurrent protection elements to protects against feeder faults.

Inverter-based sources or distributed energy resources (DER) do not typically behave like rotating sources. The IEEE 1547-2018 std. defines a DER as "A source of electric power that is not directly connected to a bulk power system." DERs are often connected directly to distribution feeders, and in a few cases may be connected directly to a distribution substation medium voltage bus. However, in most cases, the DER is sized either to support a load of a local EPS or to convert as much of an available power source to electric power as possible. DERs are not sized to provide bulk power system support, and as such, typically have much higher Thevenin source impedances than the area EPS to which they attach. Notable differences arise from the high Thevenin source impedance of DERs.

The fault current contribution from inverter-based sources is small compared to rotating sources and the power grid. If time-overcurrent elements are used at the Point of Common Coupling (PCC) to coordinate with downstream devices, the settings would have to be provided based on the short circuit capacity of the entire system. However, the inverter-based DER would provide only around 1.2 to 1.5 times the full load current as the fault contribution, which may lie far below the fault current contribution from the grid. This makes traditional over-current coordination impractical.

Voltages at DER interconnection points provide a representation of the faulted power system, which is more consistent with rotating machine-based sources. While current seen at DER PCC may not increase significantly during a fault on the area electric system, the voltage drop is significant, since it is driven mostly by the source impedance of the grid connection. In various embodiments consistent with the present disclosure, inverse voltage elements may be used as an alternative to inverse current elements, as the primary protection strategy in DER PCC relays. Further, methods for coordinating inverse overcurrent-based protection elements with the DER PCC relay using inverse voltage-based elements are disclosed.

In various embodiments consistent with the present disclosure, EPSs may use inverse time-undervoltage and inverse time overvoltage characteristics in PCC protection schemes to detect distribution feeder faults and to determine whether the associated DER should be isolated from the feeder. In this way, faults beyond other protective devices on the feeder will be cleared before the PCC protection trips, allowing the DER to remain connected throughout the disturbance.

In various embodiments, operating quantities may be selected to ensure the most sensitive detection for each fault type. Various techniques are disclosed to coordinate voltage-based characteristics with conventional 51-elements. Further, the present disclosure includes techniques to coordinate between 27I, 59I, and 51 elements for each fault type and for all faults within the area EPS.

FIG. 1A illustrates a simplified EPS including a distribution feeder supplied by a conventional source 102 and a DER 104 consistent with embodiments of the present disclosure. The impedance of the conventional source 102 is identified as $Z_{SRC}$, and the impedance of the DER 104 is identified as $Z_{DER}$. A fault 108 in the EPS is located a distance L from the PCC 106 of the conventional source 102 and the DER 104. The voltage measured at the PCC (VPCC) 106 during a bolted fault is effectively the result of a voltage divider between $Z_{DER}$ and $\eta * Z_L$. Where $\eta$ is the per-unit impedance of ZL to the fault 108.

FIG. 1B represents a simplification of the circuit of FIG. 1A, in which the conventional source and the DER are replaced by a Thevenin equivalent source 110. If both ideal voltage sources are modeled at the same magnitude and angle, then they can be modeled as the same ideal source 110. This simplification places $Z_{DER}$ in parallel with $Z_{SRC}$.

FIG. 1C represents a further simplification of the circuit model shown in FIG. 1B reflecting that $Z_{DER}$ is much larger than $Z_{SRC}$. The much larger impedance of $Z_{DER}$ can be approximated as an open circuit. Based on the simplified circuit illustrated in FIG. 1C, the voltage measured at the PCC ($V_{PCC}$) during a bolted fault is effectively the result of a voltage divider between $Z_{DER}$ and the product of M and $Z_L$, where q is the per-unit impedance of $Z_L$ to the fault.

A relay monitoring voltage at the PCC will see large deviations as the result of area EPS faults. Accordingly, voltage measurements at the PCC can provide a more reliable indication of area EPS faults as compared to current measurements. Furthermore, the product of q and $Z_L$ is unique and creates unique values of voltage measurements at the PCC. The magnitude of $V_{PCC}$ can therefore be used in establishing criteria to achieve selectivity for area EPS faults.

Variations in area EPS source strength, fault resistance, different fault types, and selectivity can be provided by using time delays to ensure area EPS protection has had a chance to clear the fault before tripping the PCC. Such a delay may be achieved using definite time-undervoltage (27) elements applied to line-neutral or line-line voltages. Settings used in specific embodiments may be optimized to achieve an optimal balance between selectivity and operating times. If the undervoltage condition still exists after the set amount of time, it is safe to assume it is still in the section to which the DER is connected, and the PCC will be tripped to isolate the DER from the faulted area EPS.

For most area EPS operators, restoring service to customers is an important metric, and as such, the system will reclose as quickly as possible after an interruption to attempt to restore normal service. However, longer time delays for voltage detection of faults mean that the area EPS remains energized by the DER for a longer period, which could delay or prevent the area EPS protection from reclosing safely. Therefore, it can be advantageous to trip the PCC as quickly as possible, with the objective of restoring normal service. In addition, it is desirable for the PCC relay to restrain for area EPS faults outside of its zone of protection to maintain continuous service for any connected loads. Various embodiments of the present disclosure may balance speed, sensitivity, and selectivity.

An inverse time-overcurrent (51) element has an operating time that inversely relates to the magnitude of fault current. Thus, higher current magnitudes result in faster operating times. With digital relays, the same principal can be applied to any measurable or calculated quantity. As discussed above in connection with FIGS. 1A-1C, voltage measurements at the PCC can yield greater sensitivity to area EPS faults than current measurements, and the inverse-time relationship may be applied to take balance speed, sensitivity, and selectivity. Further, such a solution can be applied to trip a PCC as quickly as possible for area EPS faults which require isolation of a DER, while ensuring the PCC remains closed for area EPS faults cleared by remote area EPS protection using inverse time-overcurrent (51) elements.

An inverse time-undervoltage (27I) element operates similarly to the inverse time-overcurrent (51) element. Like the inverse time-overcurrent (51) element, an operator may set a pickup, and the operation of the relay is inversely proportional to the deviation of the voltage from the set pickup. In some embodiments, the deviation may be specified using inverse multiples of pickup. Therefore, as the measured voltage magnitude decreases below the set pickup, the operating time also decreases.

An inverse time-overcurrent (51) element and an inverse time-undervoltage (27I) element respond similarly for close-in and distant faults. Faults closer to the relay produce larger currents and a more severe voltage drop, resulting in faster operating times. Conversely, faults further downline from the relay produce smaller currents and a less severe voltage drop, leading to slower operating times. This connection provides an opportunity for a 27I element and a 51 element to be coordinated in various embodiments consistent with the present disclosure.

An inverse time-undervoltage (27I) element may be described on a Time vs Voltage plane, while the inverse time-overcurrent (51) element may be described on a Time vs Current plane. In various embodiments consistent with the present disclosure, the operating characteristics of these elements may be visually represented on a common frame of reference. The common frame of reference may provide additional benefits related to coordination of these two protection elements.

Impedance can be used to relate voltage and current, and as such, for an area EPS with a known impedance, an inverse time-overcurrent (51) element and an inverse time-undervoltage (27I) may be represented on the same coordination plane, and their operations may be coordinated.

Figure 2:
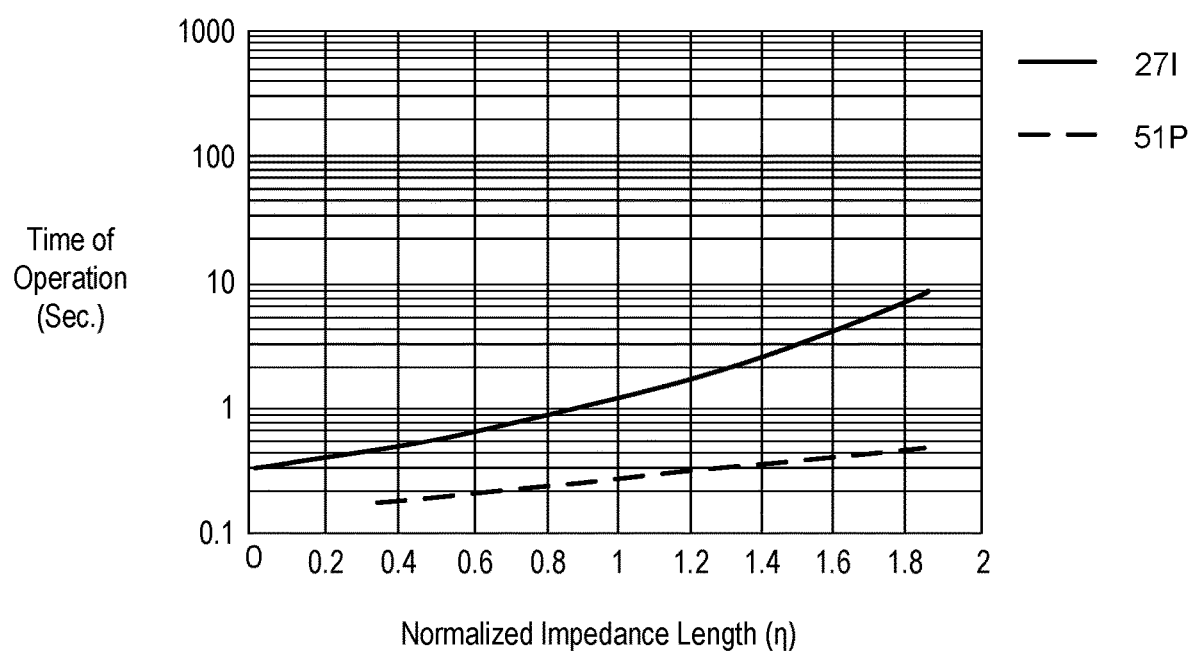
FIG. 2 illustrates a plot showing the time of operation on the y-axis of an inverse time-undervoltage (27I) element and inverse time-overcurrent (51P) element and a normalized impedance length (η) on the x-axis consistent with embodiments of the present disclosure.

FIG. 2 illustrates a plot showing the time of operation on the y-axis of an inverse time-undervoltage (27I) element and inverse time-overcurrent (51) element and a normalized impedance length (n) on the x-axis consistent with embodiments of the present disclosure. Based on a location of a fault (η), wherein η=0 represents a three-phase bolted fault at the DER Tap (Beginning of Line 1) and η=1 represents a three-phase bolted fault at the end of Line 2, the length of which is defined based on the length of line for which Relay B is considered to be the primary protection device. For any location along the length of this "protected line", a fault current seen by a Relay B for each of these fault locations can be calculated to determine a time of operation of the relay. Similarly, the minimum line-neutral voltage seen by a 27I relay can be calculated at each fault location to determine a time of operation. The results illustrate the responses of both an inverse minimum line-neutral time-undervoltage (27I) element and inverse phase time-overcurrent (51) element on the same plane. Such a plane is subsequently referred to as a Time vs Normalized Impedance Length (TNIL) plane because the x-axis normalizes both voltage and current relay characteristics to an impedance expressed in per unit of protected line length.

More specifically, this TNIL plane in FIG. 2 is a three-phase (3P) TNIL plane, since it relates the phase fault current at Relay B and minimum line-neutral voltage at Relay A for three-phase faults. For other types of faults, the mathematical relationship between these operating quantities will be different and hence each fault type may be analyzed using a separate TNIL plane.

Figure 3:
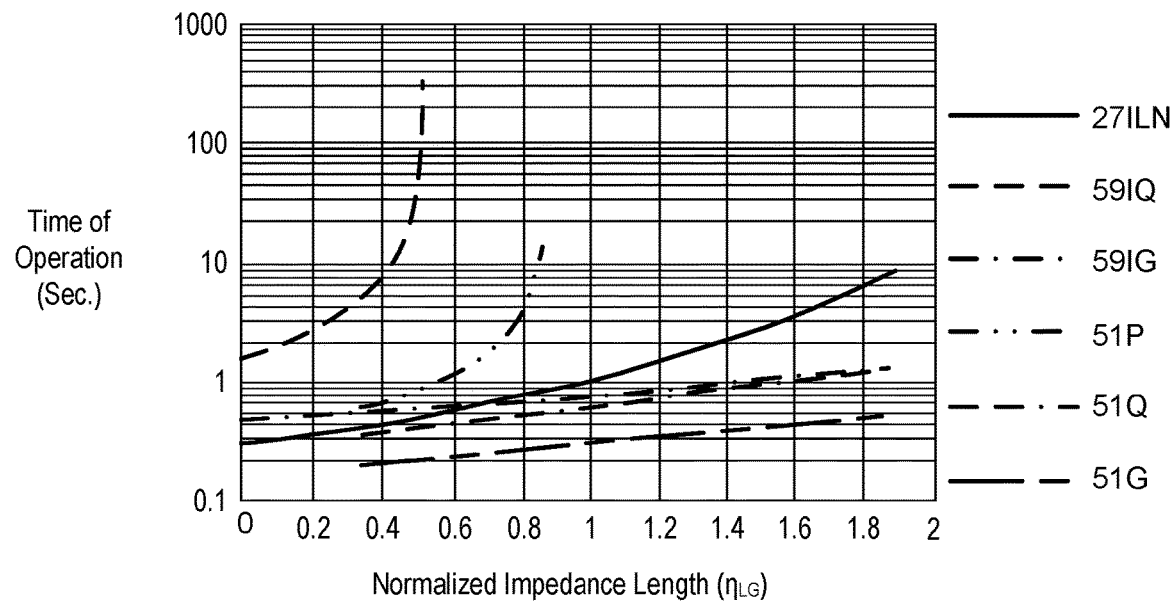
FIG. 3 shows a plot showing the time of operation on the y-axis of various elements with respect to a normalized impedance length ($η_{LG}$) on the x-axis consistent with embodiments of the present disclosure.

FIG. 3 shows a plot showing the time of operation on the y-axis of various elements with respect to a normalized impedance length ($\eta_{LG}$) on the x-axis for 1LG faults on the protected line, consistent with embodiments of the present disclosure. As may be appreciated from FIG. 3, in various embodiments, different operating quantities may be used. During a fault, on the faulted phases, the voltage magnitude decreases, and such a decrease can be detected by an inverse time-undervoltage (27I) element.

In still other embodiments, a zero-sequence or ground overcurrent (51G) element may be best suited for detection of ground faults, a negative sequence overcurrent (51Q) element may be best suited for detection of phase faults (excluding three-phase), and a phase overcurrent (51P) element may be best suited for phase faults (including three-phase).

The values of 3V0 and 3V2 increase during a fault, and the increase may be detected using overvoltage relays (59G and 59Q, respectively). An inverse time overvoltage (59I) relay using 3V0 (59IG) and 3V2 (59IQ) as operating quantities may detect ground and unbalanced faults in various embodiments consistent with the present disclosure. These operating quantities may be mapped to the TNIL plane for coordination with other elements.

For the purposes of coordinating voltage and current relays on a three-phase power system, embodiments consistent with the present disclosure may map the 27I, 59I, and 51 characteristics on unique TNIL planes for each of a variety of fault types (e.g., three-phase (3P), phase-to-phase (LL), single-phase-to-ground (1LG), and phase-to-phase-to-ground (LLG)).

In various embodiments, a 27ILN element and a 51P element may be coordinated on a three-phase TNIL plane, a 59GI element and a 51G element may be coordinated on a 1LG TNIL plane, and a 59QI element and either a 51P or 51Q element may be coordinated on an LL TNIL plane, to maximize selectivity, speed of operation, sensitivity and reliability of protection device operation for various types of faults on the area electric power system. The operating characteristics of 27ILN, 59IQ, 59IG, 51P, 51G, 51Q, elements can be plotted on various TNIL planes for any fault location (η), where η is the length of the faulted part of the line normalized to the total length of the line. By plotting the inverse-time voltage protection elements with the corresponding inverse-time current protection elements on a respective TNIL plane, a protection philosophy consistent with the present disclosure may be realized.

Figure 4:
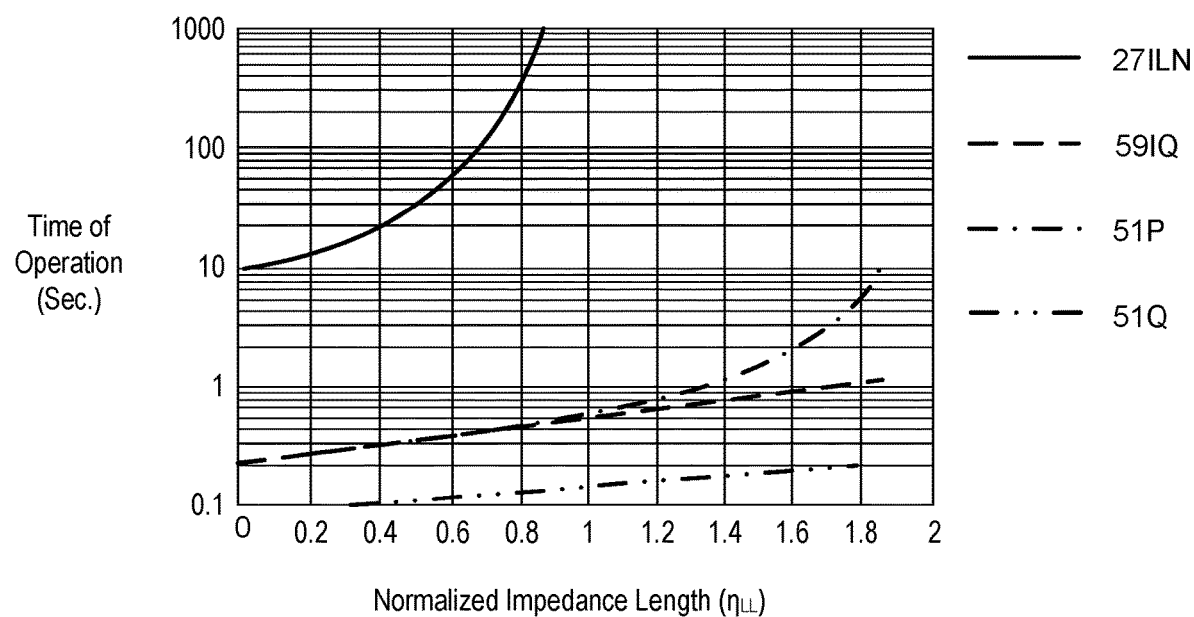
FIG. 4 shows a plot of one example of Time vs Normalized Impedance Length (TNIL) characteristics of a phase-to-phase (LL) fault for an inverse time-undervoltage (27I) element, an inverse time over-voltage (59I) element, a phase time-overcurrent (51P) element, and a negative sequence time-overcurrent (51Q) element consistent with embodiments of the present disclosure.

FIG. 4 shows a plot of one example of TNIL characteristics of a phase-to-phase (LL) fault for an inverse time-undervoltage (27I) element, an inverse time over-voltage (59I) element, a phase time-overcurrent (51P) element, and a negative sequence time-overcurrent (51Q) element consistent with embodiments of the present disclosure. FIG. 4 illustrates that the 27I, 59I, and 51 characteristics for each operating quantity differ in the TNIL plane for each fault type. FIG. 3 and FIG. 4 show significant differences in the 51Q and 59IQ elements between the two fault types. It may be noted that the 51G and 59IG elements may provide the most sensitive fault detection for 1LG faults (FIG. 3) while 51Q and 59IQ provide the most sensitive fault detection for LL faults (FIG. 4). If a 51Q element is not available, a 51P element may provide another option for detecting faults, not including ground faults, and the 59IQ relay must then be coordinated with the 51P element. The 27ILN, 59IG, and 59IQ elements may provide the simplest coordination with 51P, 51G, and 51Q elements respectively. These examples demonstrate that certain operating quantities can be more useful for detection of each fault type.

Figure 5:
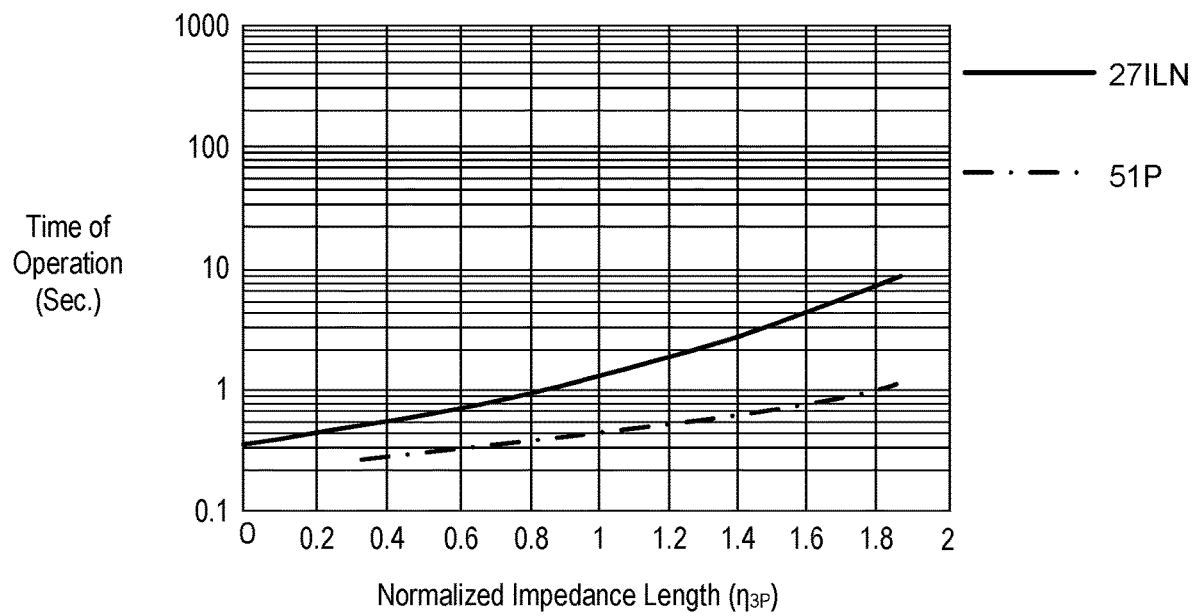
FIG. 5 shows a plot of one example of TNIL characteristics of a three-phase (3P) fault for an inverse time-undervoltage (27I) element, an inverse time over-voltage (59I) element, a phase time-overcurrent (51P) element, and a negative sequence time-overcurrent (51Q) element consistent with embodiments of the present disclosure.

FIG. 5 shows a plot of one example of TNIL characteristics of a three-phase (3P) fault for an inverse time-undervoltage (27I) element, an inverse time over-voltage (59I) element, a phase time-overcurrent (51P) element, and a negative sequence time-overcurrent (51Q) element consistent with embodiments of the present disclosure. FIG. 5 again demonstrates the differences between the responses of these elements based on the type of fault.

Figure 6:
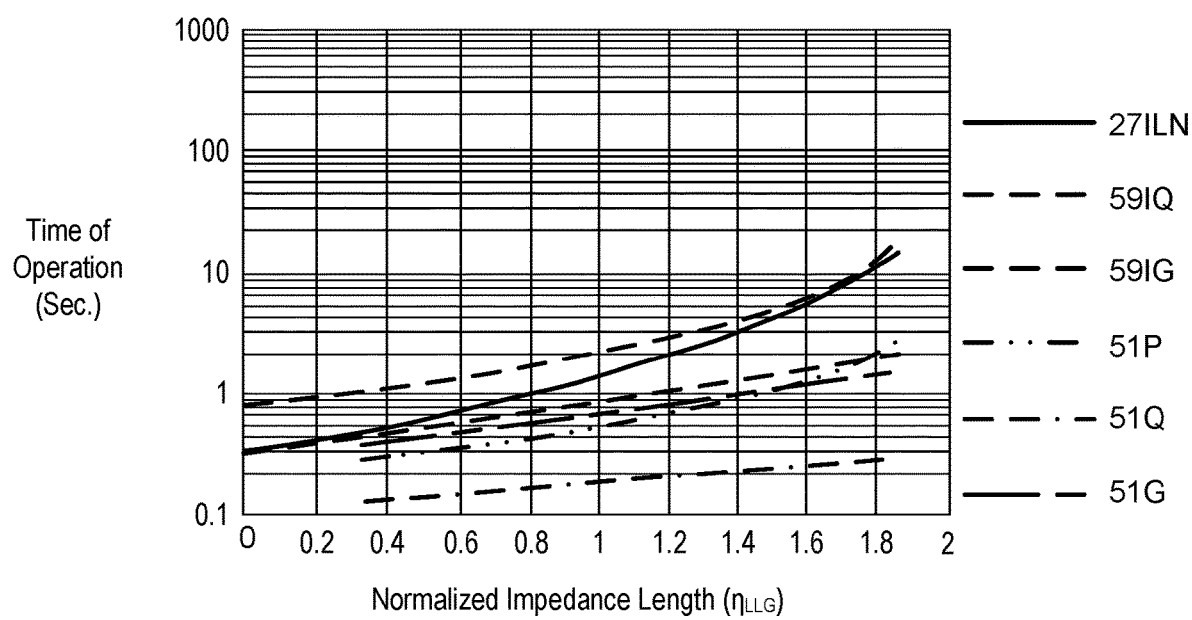
FIG. 6 shows a plot of one example of TNIL characteristics of a phase-to-phase-to-ground (LLG) fault for an inverse time-undervoltage (27I) element, an inverse time over-voltage (59I) element, a phase time-overcurrent (51P) element, and a negative sequence time-overcurrent (51Q) element consistent with embodiments of the present disclosure.

FIG. 6 shows a plot of one example of TNIL characteristics of a phase-to-phase-to-ground (LLG) fault for an inverse time-undervoltage (27I) element, an inverse time over-voltage (59I) element, a phase time-overcurrent (51P) element, and a negative sequence time-overcurrent (51Q) element consistent with embodiments of the present disclosure. For the LLG fault type, for which multiple voltage-based relays (involving various operating quantities) are potentially impacted, the fastest response of the 27I/59I elements is still slower than the fastest response of the 51 elements for all fault locations. Even though some voltage element curves intersect current element curves, coordination may be achieved by evaluating the minimum response of all voltage relay curves implemented at the PCC against the minimum response of all current relay curves implemented in remote area EPS protection for any given fault location. In FIG. 6, the 59IQ element operates before the 51P element for remote LLG faults. The remote overcurrent device will still trip first for the fault in its zone because the 51Q element and the 51G element still operate before 59IQ element for remote LLG faults.

FIGS. 3-6 demonstrate that various elements may be used and coordinated to provide protection for different types of faults. For example, coordinating a 27ILN element with a 51P element may provide protection for three-phase (3P) faults. In systems where a 51Q element is available, a 59IQ element may be coordinated to detect a phase-to-phase (LL) fault. If a 51Q element is not available, a 51P element may be coordinated with a 59IQ element to detect a phase-to-phase (LL) fault. Finally, a 51IG element may be coordinated with a 51G element to detect a single-phase-to-ground (1LG) fault.

In one specific embodiment, the following procedure may be used to coordinate voltage-based elements and current-based elements. First, the voltage-based elements can be coordinated with the current based elements using methods known to one of skill in the art by specifying the curve and time dial for the inverse-time voltage characteristic on the respective TNIL plane. Second, to set the inverse-time voltage pickups, find the value of q, for each fault type ($\eta_{3P}$, $\eta_{LL}$, $\eta_{LG}$), in which the fault current magnitude is approximately equal to 150% of the respective 51 pickup (51P, 51Q or 51P, 51G) of the feeder protection relay or recloser control. Third, the 3P-TNIL plane may be used to coordinate 27ILN with 51P. The pickup of 27ILN may be set to the minimum line-neutral voltage at the PCC for a fault at $\eta_{3P}$. $\eta_{3P}$ is calculated with fault current equal to 150% of the pickup of 51P. The pickup may be set lower than the minimum line-neutral voltage at worst case emergency loading, to prevent a DER trip on load conditions. Fourth, it may be determined whether 51Q is used on the feeder fault protection relay or recloser control (area EPS protection). If so, 59IQ may be coordinated with 51Q on the LL-TNIL plane with the pickup of 59IQ equal to the negative-sequence voltage at the PCC for a fault at $\eta_{LL}$. In this case, $\eta_{LL}$ may be calculated with fault current equal to 150% of the pickup of 51Q. If not, 59IQ with may be coordinated with 51P on the LL-TNIL plane with the pickup of 59IQ equal to the negative-sequence voltage at the PCC for a fault at $\eta_{LL}$. In this case, $\eta_{LL}$ may be calculated with fault current equal to 150% of the pickup of 51P. The 59IQ pickup may be set higher than the maximum negative-sequence voltage at worst case of load imbalance. Finally, 59IG may be coordinated with 51G on the 1LG-TNIL plane. The pickup of 59IG may be set to the zero-sequence voltage at the PCC for a fault at $\eta_{LG}$. $\eta_{LG}$ is calculated with fault current equal to 150% of the pickup of 51G. The 59IG pickup may be set higher than the maximum zero-sequence voltage at worst case of load imbalance.

Figure 7:
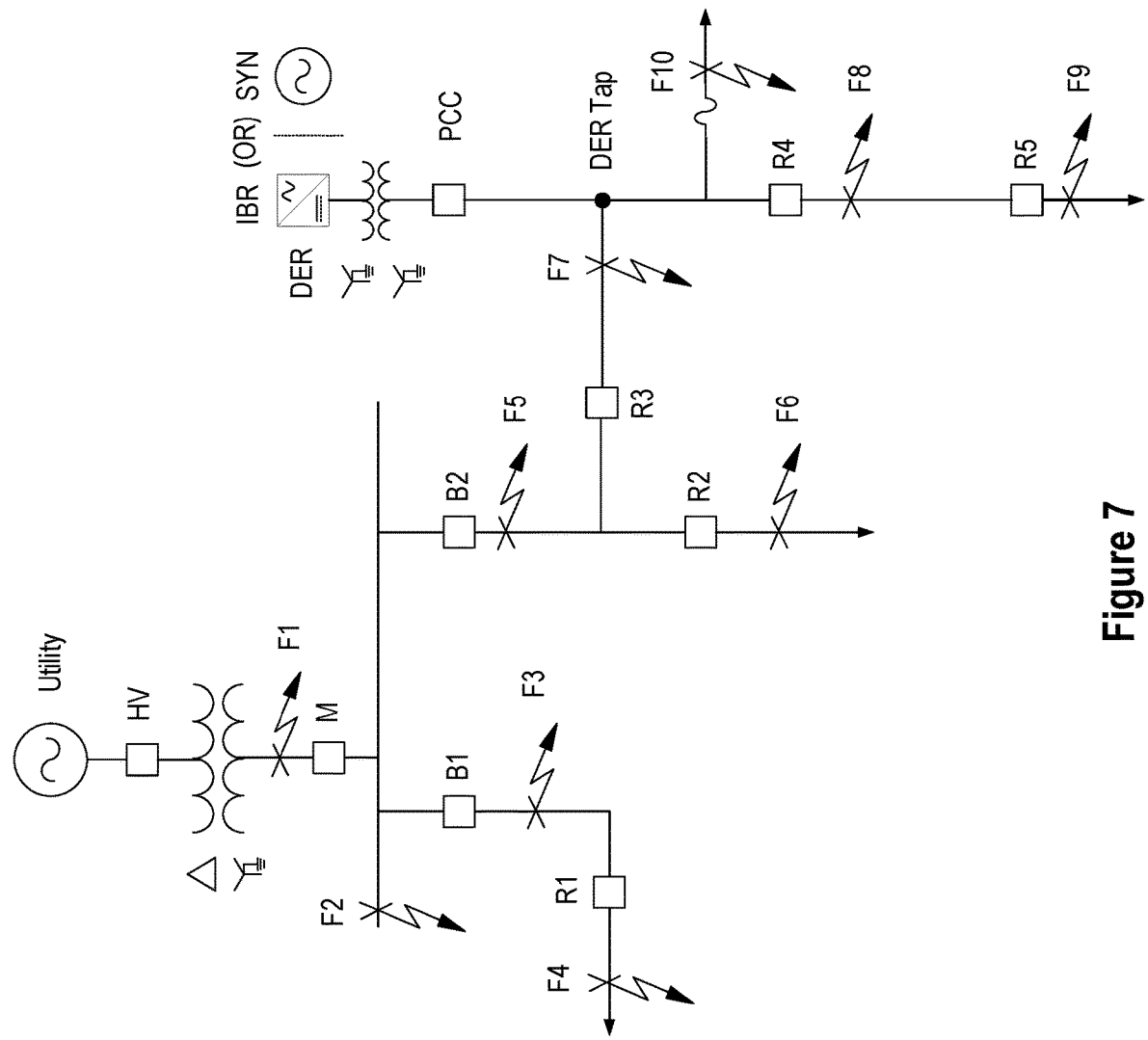
FIG. 7 illustrates a simplified line diagram of an EPS with a DER consistent with embodiments of the present disclosure.

FIG. 7 illustrates a simplified line diagram of an EPS with a DER consistent with embodiments of the present disclosure. On radial systems, current-based protection elements are inherently selective as they operate only for faults downstream of the device, while voltage-based protection elements can operate for faults occurring anywhere on the power system as long as the operating quantities meet or exceed the pickup requirements. The potential for operation of voltage-based protective elements requires coordination of the operation of such elements to ensure that selectivity is maintained, regardless of the location of the fault.

A variety of potential fault locations are identified in FIG. 7 as F1-F10. Potential fault locations include the interconnection feeder between the PCC and the distribution substation, such as F5 and F7, and faults downstream of the PCC on the same feeder such as F8 and F9. Faults on lateral portions of the feeder have also been identified as F6 and F10, while faults on adjacent feeders have been identified as F3 and F4. Faults may also occur within a substation, such as F1 and F2.

Based on the fault location, the protection system should respond appropriately to maximize selectivity without compromising dependability. The fault locations shown in FIG. 7 represent various permutations of expected relay operation. Table 1 lists the primary protection device that is expected to isolate a utility source from the fault. This table also shows the expected response of the PCC relay to these faults. As shown in the table, it is expected that the PCC relay will trip for faults F1, F2, F5, and F7 since the removal of the substation source would create an island if the PCC is not tripped. For all other faults, it is expected that the PCC relay will operate slowly enough to allow the other devices to trip first and maximize selectivity.

TABLE 1

| Fault Location | Primary Device Used to Isolate Substation Source | Expected Response of PCC Relay |
| --- | --- | --- |
| F1 | HV | Trip to prevent islanding |
| F2 | M | Trip to prevent islanding |
| F3 | B1 | Coordinate with B1 |
| F4 | R1 | Coordinate with B1 |
| F5 | B2 | Trip to prevent islanding |
| F6 | R2 | Coordinate with R2 |
| F7 | R3 | Trip to prevent islanding |
| F8 | R4 | Coordinate with R4 |
| F9 | R5 | Coordinate with R4 |
| F10 | Fuse | Coordinate with fuse |

For this example, the PCC relay will have to coordinate with the current-based relays at B1, R2, R4 and the lateral fuse for any faults occurring in the zone of protection of these devices. When inverse time voltage protection elements are used in the PCC relay, these inverse time voltage elements may coordinate with the current-based relays. This coordination may be performed using the TNIL characteristics as discussed above.

Figure 8:
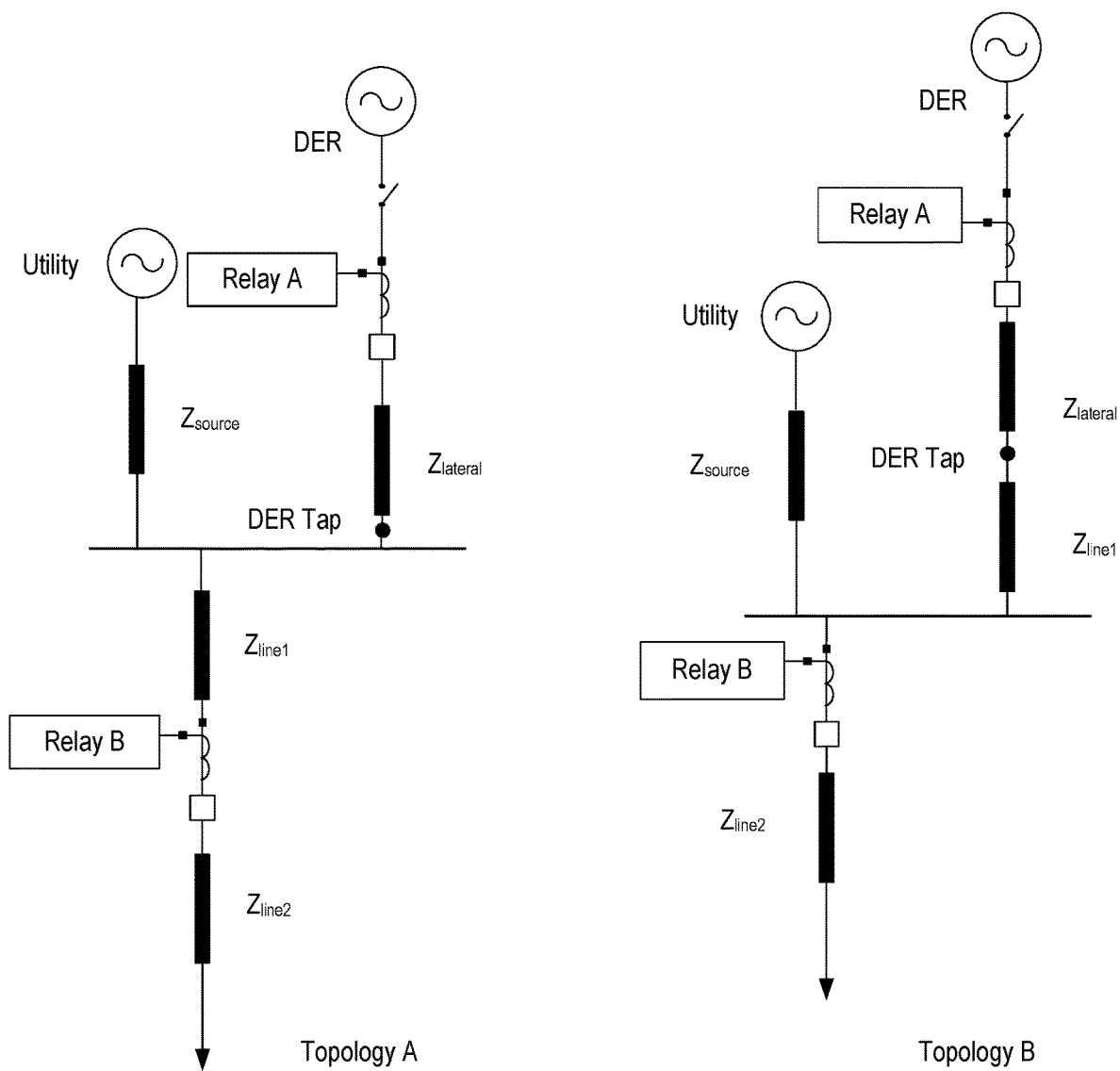
FIG. 8 illustrates two topologies that may be used to estimate impedances of various sources and lines to determine impedances used for TNIL plots consistent with embodiments of the present disclosure.

FIG. 8 illustrates two topologies that may be used to estimate impedances of various sources and lines to determine impedances used for TNIL plots, consistent with embodiments of the present disclosure. Relay A may be embodied as a voltage-based relay at a PCC, and Relay B may be embodied as a current-based relay. The two topologies of the model are based on the location of the PCC (Relay A) with respect to the current-based relay (Relay B). As shown in this figure, in Topology A coordination pairs, "Line 1" represents the impedance between Relay A and Relay B, while "Line 2" represents the impedance downstream of Relay B, within which lay the fault locations for which Relay A and Relay B are configured to coordinate.

In Topology A, Relay A may be embodied using inverse-time voltage elements, and Relay B may be embodied using traditional inverse-time overcurrent elements. For any fault occurring on Line 1, Relay A will operate without having to coordinate with any other protective device. For faults occurring on Line 2, Relay B will operate first, and Relay A may be time-coordinated with Relay B.

As discussed above in connection with FIG. 1, the Thevenin impedance of the Area EPS source ($Z_{SRC}$) is much smaller than the Thevenin impedance of DER ($Z_{DER}$), so the influence of the DER source may be ignored while performing coordination. In other words, the model consists of only one positive sequence source and the DER source is assumed to be an open circuit.

Figure 9:
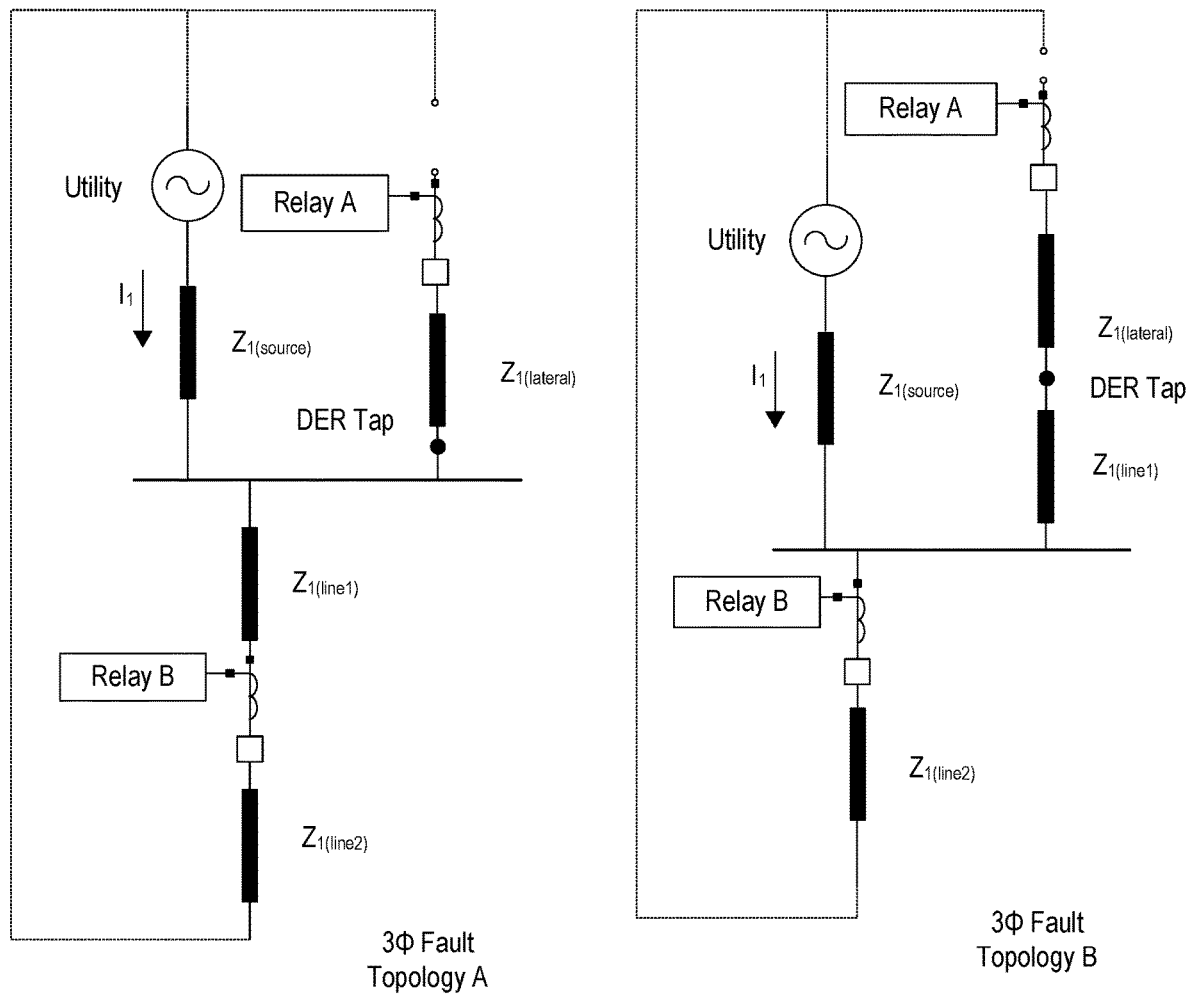
FIG. 9 illustrates two topologies for a fault occurring downstream of relay B in FIG. 8 consistent with embodiments of the present disclosure.

FIG. 9 illustrates two topologies for a fault occurring downstream of Relay B in FIG. 8 consistent with embodiments of the present disclosure. When the DER is assumed to be open circuited and the effect of load is ignored, FIG. 9 is the result of fault occurring downstream of Relay B. In Topology A, for any faults downstream of Relay B the fault current will also flow through "Line 1" and encounter impedance $Z_{1(Line1)}$. Conversely, in Topology B, the fault current will not flow through "Line 1" or encounter impedance $Z_{1(Line1)}$.

In topology B coordination pairs, "Line 1" impedance may be considered to be zero, since the impedance between Relays A and B has no effect on the operating quantities measured by Relay A, when effect of load and the DER is ignored. It is also common to find DERs coupled on a tapped lateral from the primary feeder connecting to the substation bus. In such cases, for both topology A and B coordination pairs, this tapped lateral impedance may be ignored.

For example, the PCC relay in the distribution system shown in FIG. 7 is expected to coordinate with relay R4 as shown in Table 1. To coordinate these two devices, Topology A can be used to calculate the values of the Source, Line 1, and Line 2 impedances. Based on the location of the PCC relay (Relay A), the Source impedance includes the equivalent impedance of the utility source, the substation transformer, and the line impedance between the substation bus and PCC. Based on the location of R4 (Relay B), Line 1 impedance is chosen as the impedance of the distribution line between the PCC tap and R4. Line 2 impedance is the distribution line impedance between R4 and R5, or to the length of this line for which R4 is expected to behave as the primary protective device.

To evaluate the coordination pairs between Relays A and B, the operating time for both of these relays are plotted for faults occurring on the distribution line at various locations. Thus, operating times for faults occurring along the length of "Line 2" are plotted in the time vs normalized impedance length characteristic plane, since these relays are expected to coordinate for these faults. In topology A coordination pairs, operating times for faults occurring along the length of "Line 1" are also shown on the TNIL plane, even if these faults will not be seen by Relay B. This allows the visualization of Relay A's operating time for faults occurring close to the PCC, for which the DER PCC relay is expected to trip.

The horizontal axis (x-axis) of the TNIL curve represents the faulted length of the protected line, normalized by the total length of the line. The total length of the protected line is considered as the sum of Line 1 and Line 2 length in miles. Continuing with the example of coordination between PCC and R4, the total line length would be the length of the distribution line from breaker B2 to R5. The Greek letter "q" is used to represent the normalized impedance length in this paper, which is defined by Eq. 1.

$$\eta = \frac{\text{Distance of fault from Relay } A}{\text{Line1} + \text{Line2}} \quad \text{Eq. 1}$$

In topology B models, such as the coordination between PCC and B1, Line 1 length and the associated impedance are taken as zero. The numerator in Equation 1 can be considered instead as "Distance from Relay B to Fault" as shown below in Eq. 2.

$$\eta = \frac{\text{Distance of fault from Relay } B}{\text{Line2}} \quad \text{Eq. 2}$$

The vertical axis (y-axis) of the TNIL curve represents the time of operation of the protective relays A and B. To calculate the time of operation, the operating quantity measured at each relay location is calculated for every point $\eta$, where $0 \leq \eta \leq 1$. Based on Equations 1 and 2, $\eta=0$ represents a fault at the DER tap and $\eta=1$ represents a fault at the end of "Line 2". The upper limit for "i" can be chosen to be higher than 1 to evaluate the coordination for faults occurring downstream of "Line 2".

Figure 10:
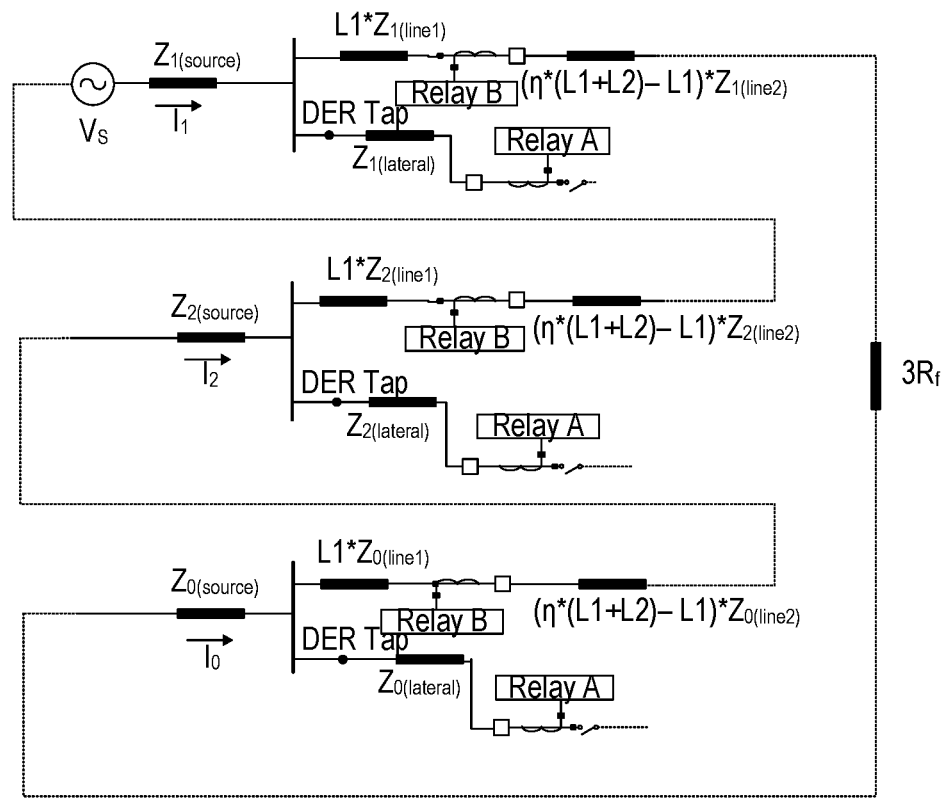
FIG. 10 illustrates impedance networks for single-phase-to-ground faults on a Topology A coordination pairs consistent with embodiments of the present disclosure.
Figure 10:
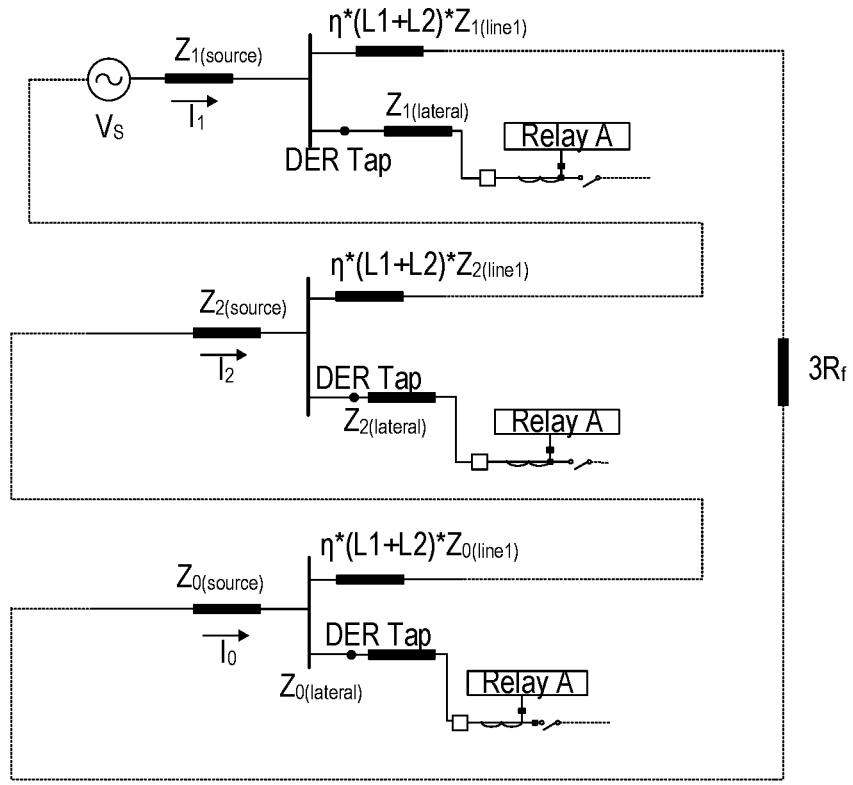

FIG. 10 illustrates impedance networks for single-phase-to-ground (SLG) faults on Topology A coordination pairs consistent with embodiments of the present disclosure. Operating quantities that would be measured by Relays A and B can be calculated using various techniques, such as symmetrical network analysis. In the illustrated embodiment, a line-ground fault is used as an example for the PCC and R4 coordination pair. Impedance networks for other types of faults can be determined by those of skill in the art.

FIG. 10 shows a line-ground fault on Line 2 and the associated impedances. $Z_{1(source)}$, $Z_{2(source)}$, and $Z_{0(source)}$ are the positive, negative, and zero-sequence "Source" impedances, respectively. Similarly, $Z_{1(line1)}$, $Z_{2(line1)}$, $Z_{0(line1)}$ are the per-unit sequence impedances for "Line 1," and $Z_{1(line2)}$, $Z_{2(line2)}$, $Z_{0(line2)}$ are the per-unit sequence impedances for "Line 2." On systems where the substation transformer creates a break in the zero-sequence impedance network (e.g., a delta-wye transformer), $Z_{0(source)}$ may disregard any impedance upstream of this transformer, since there is an open circuit.

The effective sequence impedances of the Topology A network in FIG. 10 can be calculated using Equations 3-5, and the effective sequence impedances of the Topology B Network can be calculated using Equations 6-8.

$$Z_1 = Z_{1(source)} + L1 * Z_{1(line1)} + (\eta*(L1+L2) - L1)*Z_{1(line2)} \quad \text{Eq. 3}$$

$$Z_2 = Z_{2(source)} + L1 * Z_{2(line1)} + (\eta*(L1+L2) - L1)*Z_{2(line2)} \quad \text{Eq. 4}$$

$$Z_0 = Z_{0(source)} + L1 * Z_{0(line1)} + (\eta*(L1+L2) - L1)*Z_{0(line\,2)} \quad \text{Eq. 5}$$

$$Z_1 = Z_{1(source)} + \eta*(L1+L2)*Z_{1(line1)} \quad \text{Eq. 6}$$

$$Z_2 = Z_{2(source)} + \eta*(L1+L2)*Z_{2(line1)} \quad \text{Eq. 7}$$

$$Z_0 = Z_{0(source)} + \eta*(L1+L2)*Z_{0(line1)} \quad \text{Eq. 8}$$

The operating quantities that would be measured by Relay B may be calculated in Equation 9, while the operating quantities that would be measured by Relay A may be calculated using Equations 10-12.

$$I_f = 3I_0 = 3I_2 = \frac{3*V_S}{Z_1 + Z_2 + Z_0 + 3*R_F} \quad \text{Eq. 9}$$

$$3V_2 = \frac{-Z_{2(source)}*I_f}{3} \quad \text{Eq. 10}$$

$$3V_0 = \frac{-Z_{0(source)}*I_f}{3} \quad \text{Eq. 11}$$

$$V_{MIN} = V_S - \frac{I_f}{3}[Z_{1(source)} + Z_{2(source)} + Z_{0(source)}] \quad \text{Eq. 12}$$

Figure 11:
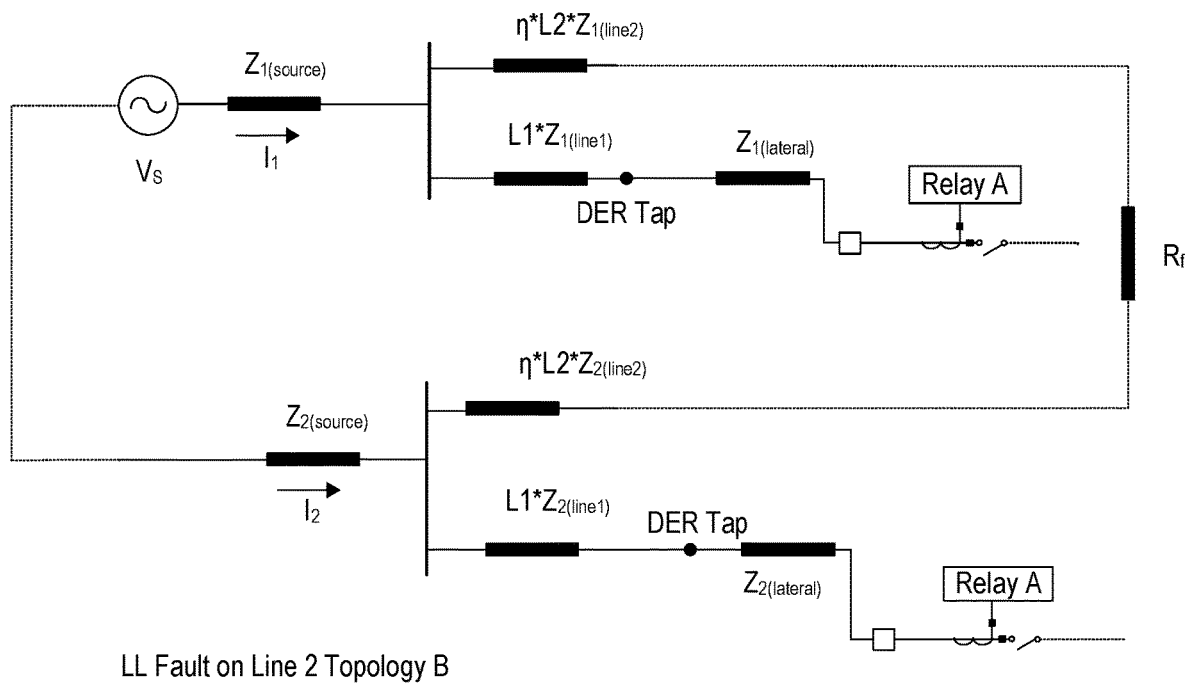
FIG. 11 illustrates an impedance network for a line-to-line (LL) fault on a Topology B for point of common coupling (PCC) B1 coordination consistent with embodiments of the present disclosure.

FIG. 11 illustrates an impedance network for a line-to-line (LL) fault on Topology B for PCC-B1 coordination consistent with embodiments of the present disclosure. Only faults on "Line 2" need to be considered because "Line 1" impedance is zero for topology B models. The phase and sequence voltages that would be measured by Relay A depend only on the impedances of "Source" and the faulted portion of "Line 2" because the DER is assumed to be open circuited and the influence of load is ignored. Similarly, any lateral impedance between the PCC and the protected line can also be ignored. Equations 13-15 show the effective sequence impedances of the network in FIG. 11.

$$Z_1 = Z_{1(source)} + \eta*L2*Z_{1(line2)} \quad \text{Eq. 13}$$

$$Z_2 = Z_{2(source)} + \eta*L2*Z_{2(line2)} \quad \text{Eq. 14}$$

$$Z_0 = Z_{0(source)} + \eta*L2*Z_{0(line2)} \quad \text{Eq. 15}$$

For an LL fault, Relay B would measure the operating quantities as calculated in Equations 16-18, and Relay A would measure the operating quantities as calculated in Equations 19-21.

$$3I_2 = \frac{-3*V_S}{Z_1 + Z_2 + R_F} \quad \text{Eq. 16}$$

$$3I_0 = 0 \quad \text{Eq. 17}$$

$$I_f = I_2\sqrt{3}\,i \quad \text{Eq. 18}$$

$$3V_2 = aZ_{S2}I_f\sqrt{3}\,i \quad \text{Eq. 19}$$

$$3V_0 = 0 \quad \text{Eq. 20}$$

$$V_{MIN} = a^2 V_S - \frac{a^2 Z_{S1} I_f * i}{\sqrt{3}} + \frac{a Z_{S2} I_f * i}{\sqrt{3}} \quad \text{Eq. 21}$$

Figure 12:
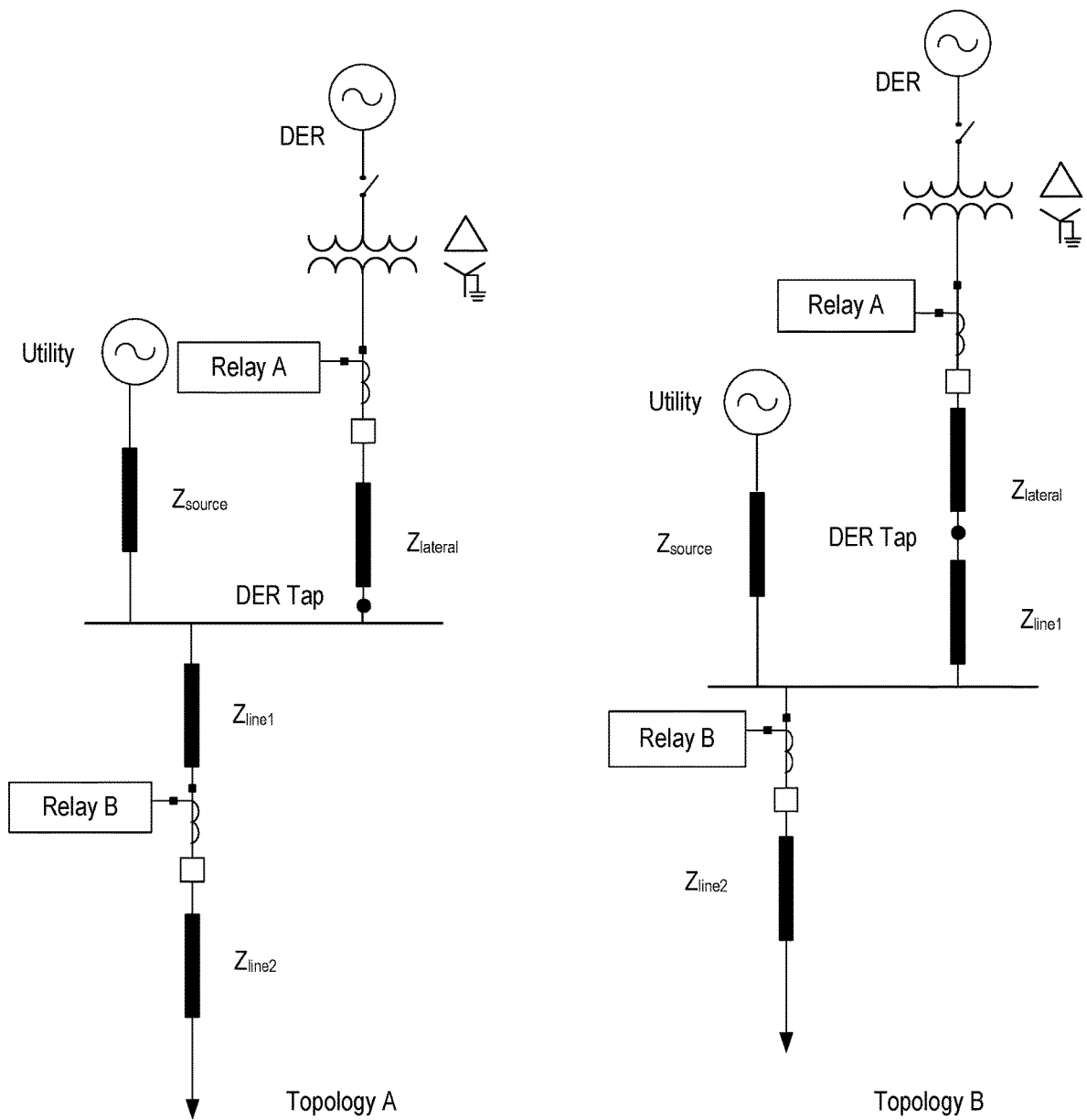
FIG. 12 illustrates a diagram of a model including a delta-wye grounded transformer consistent with embodiments of the present disclosure.

FIG. 12 illustrates a diagram of a model including a delta-wye grounded transformer consistent with embodiments of the present disclosure. A delta wye-grounded transformer may be used in various embodiments to connect the DER to the distribution system. When a grounded wye winding is on the distribution system side, it can create a low impedance path for zero-sequence current to flow. Under such condition, the effect of this zero-sequence path may be considered in the calculation of the operating quantities for Relays A and B, since this transformer connection is a zero-sequence source. Calculations for faults that do not involve the zero-sequence network remain unaffected, while 1LG and LLG fault calculations are affected.

Figure 13:
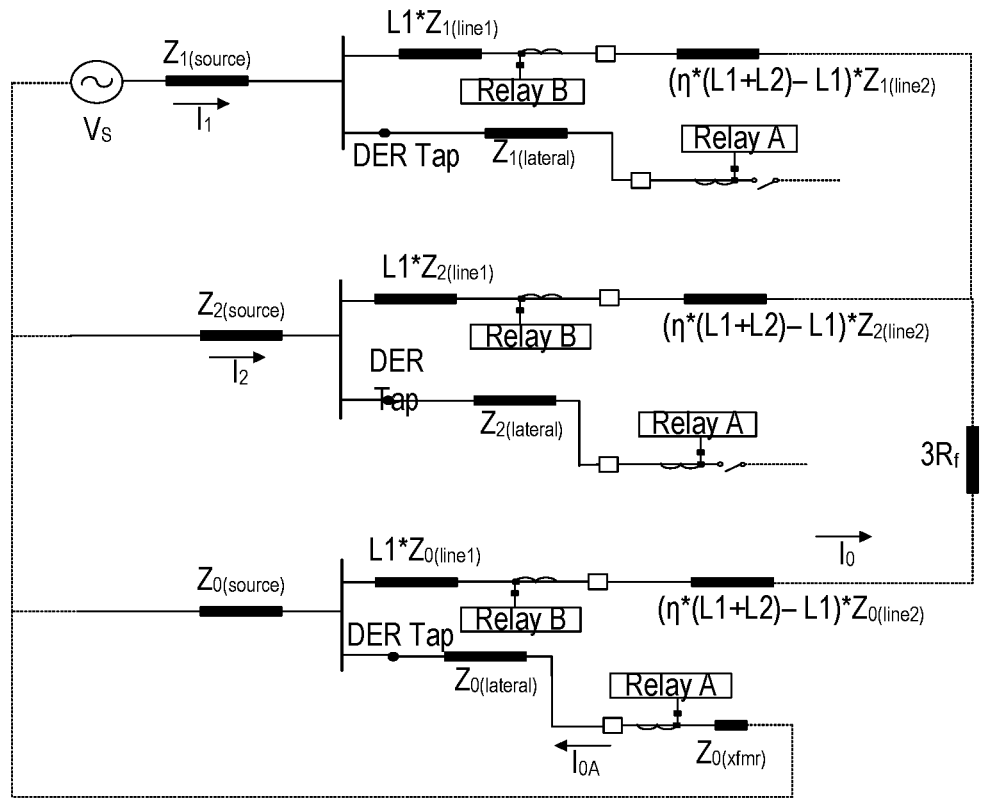
FIG. 13 illustrates two topologies of impedance networks for phase-to-phase-to-ground (LLG) faults consistent with embodiments of the present disclosure.
Figure 13:
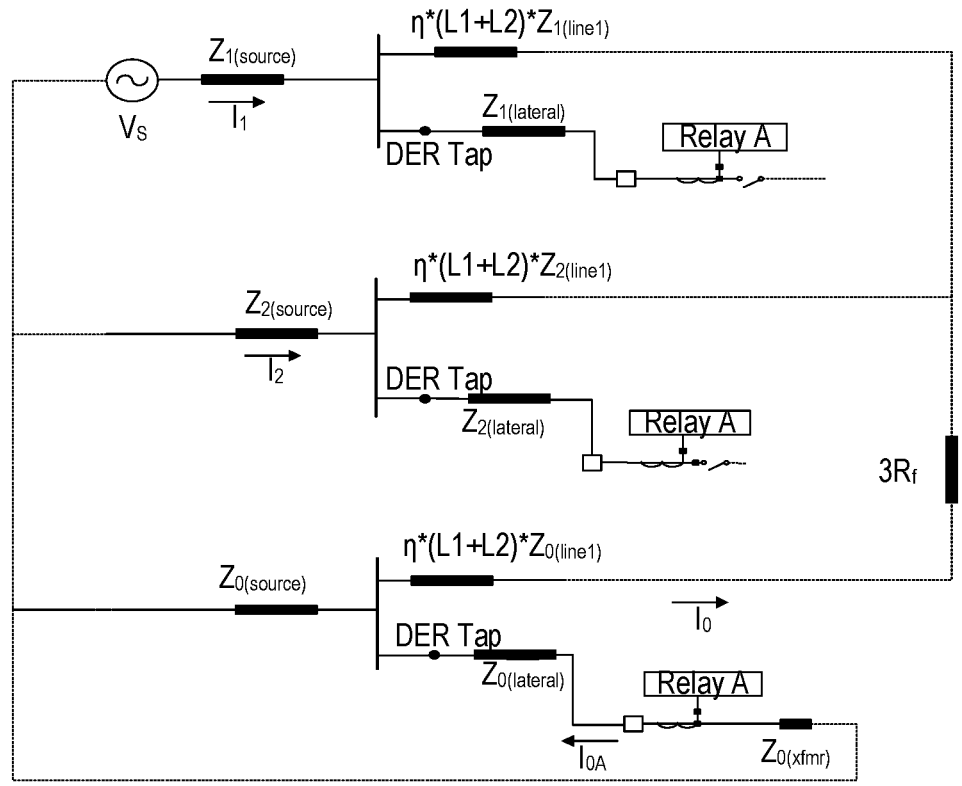

FIG. 13 illustrates two topologies of impedance networks for phase-to-phase-to-ground (LLG) faults consistent with embodiments of the present disclosure. The zero-sequence impedance of the lateral feeder is $Z_{0(lateral)}$, and the zero-sequence impedance of the interconnecting grounding transformer for this distribution system is $Z_{0(xfmr)}$. Equations 22-24 show the effective sequence impedances of the network in FIG. 13 topology A.

$$Z_1 = Z_{1(source)} + L1 * Z_{1(line1)} + (\eta*(L1+L2) - L1)*Z_{1(line2)} \quad \text{Eq. 22}$$

$$Z_2 = Z_{2(source)} + L1 * Z_{2(line1)} + (\eta*(L1+L2) - L1)*Z_{2(line2)} \quad \text{Eq. 23}$$

$$Z_0 = \frac{Z_{0(source)}*(Z_{0(lateral)} + Z_{0(xfmr)})}{Z_{0(source)} + Z_{0(lateral)} + Z_{0(xfmr)}} + \quad \text{Eq. 24}$$

$$L1 * Z_{0(line1)} + (\eta*(L1+L2) - L1)*Z_{0(line2)}$$

Equations (25) to (27) show the effective sequence impedances of the network in FIG. 13 topology B.

$$Z_1 = Z_{1(source)} + \eta*(L1+L2)*Z_{1(line1)} \quad \text{Eq. 25}$$

$$Z_2 = Z_{2(source)} + \eta*(L1+L2)*Z_{2(line1)} \quad \text{Eq. 26}$$

$$Z_0 = \frac{Z_{0(source)}*(Z_{0(lateral)} + Z_{0(xfmr)})}{Z_{0(source)} + Z_{0(lateral)} + Z_{0(xfmr)}} + \eta*(L1+L2)*Z_{0(line1)} \quad \text{Eq. 27}$$

For this LLG fault, Relay B would measure the operating quantities as calculated in Equations 28-32.

$$Z_{Eff} = Z_1 + \frac{Z_2 * (Z_0 + 3R_F)}{Z_2 + Z_0 + 3R_F} \quad \text{Eq. 28}$$

$$I_1 = \frac{V_s}{Z_{Eff}} \quad \text{Eq. 29}$$

$$3I_2 = -3I_1\left(\frac{Z_0 + 3R_F}{Z_2 + Z_0 + 3R_F}\right) \quad \text{Eq. 30}$$

$$3I_0 = -3I_1\left(\frac{Z_2}{Z_2 + Z_0 + 3R_F}\right) \quad \text{Eq. 31}$$

$$I_f = I_1\left(\frac{(a^2 - a)(Z_0 + 3R_F) + (a^2 - 1)Z_2}{Z_2 + Z_0 + 3R_F}\right) \quad \text{Eq. 32}$$

Operating quantities for Relay A are given in Equations 33-37. The calculations can be simplified by introducing a temporary variable y in Eq 32, as shown below in Eq. 33.

$$I_f = I_1 \gamma \quad \text{Eq. 33}$$

$$I_1 = \frac{I_f}{\gamma} \quad \text{Eq. 34}$$

$$3V_2 = 3Z_2 \frac{I_f}{\gamma}\left(\frac{Z_0 + 3R_F}{Z_2 + Z_0 + 3R_F}\right) \quad \text{Eq. 35}$$

$$3V_0 = \frac{3I_f}{\gamma}\left(\frac{Z_2}{Z_2 + Z_0 + 3R_F}\right)\left(\frac{Z_{S0}}{Z_{S0} + Z_{TL0} + Z_{T0}}\right)Z_{T0} \quad \text{Eq. 36}$$

$$V_{MIN} = \left(V_S - \frac{I_f}{\gamma} Z_{S1}\right) + V_2 + V_0 \quad \text{Eq. 37}$$

Figure 14:
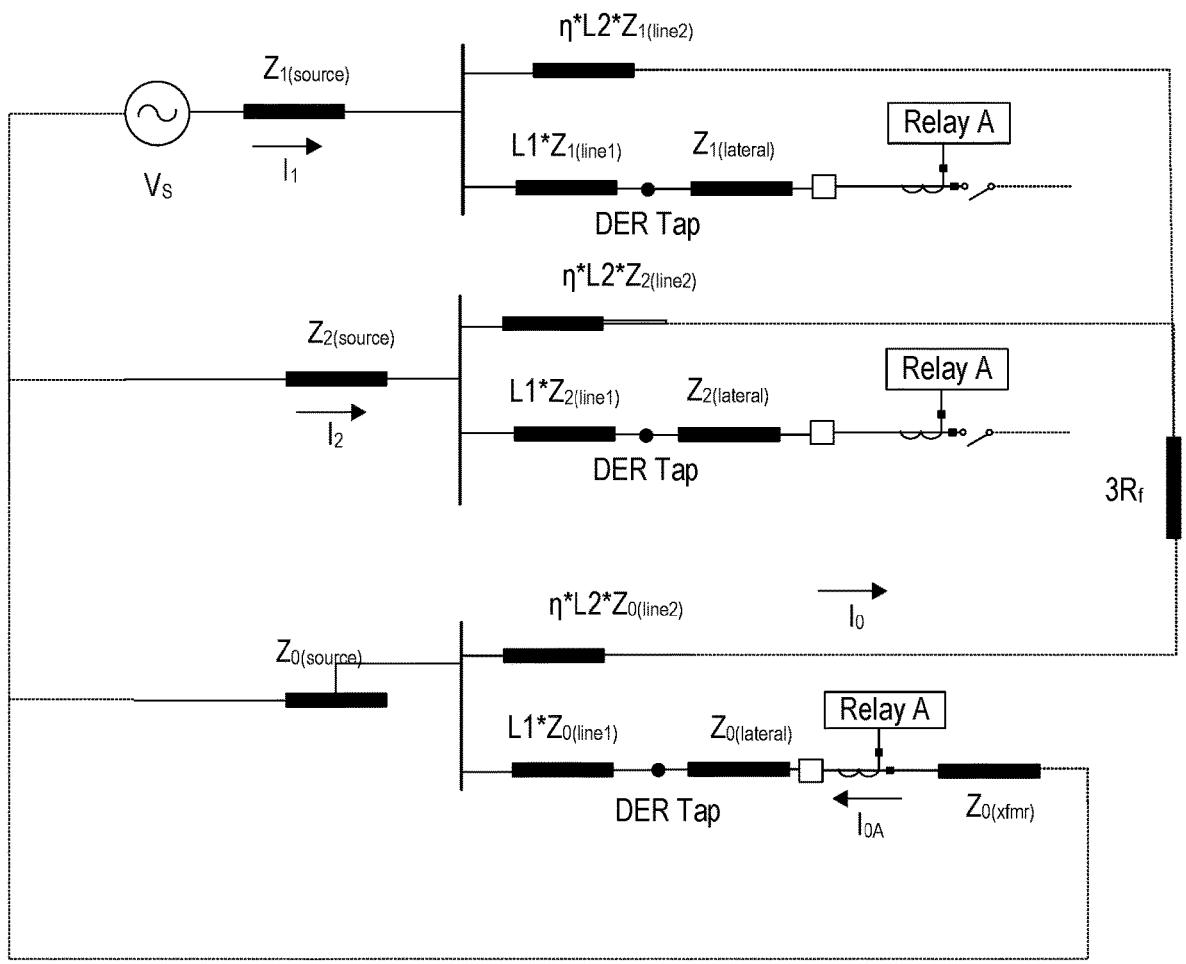
FIG. 14 illustrates a diagram showing the effect of an additional zero-sequence path for an LLG fault consistent with embodiments of the present disclosure.

FIG. 14 illustrates a diagram showing the effect of an additional zero-sequence path for an LLG fault consistent with embodiments of the present disclosure. Equations 38-40 show the effective sequence impedances of the network.

$$Z_1 = Z_{1(source)} + \eta * L2 * Z_{1(line2)} \quad \text{Eq. 38}$$

$$Z_2 = Z_{2(source)} + \eta * L2 * Z_{2(line2)} \quad \text{Eq. 39}$$

$$Z_0 = \frac{Z_{0(source)} * (Z_{0(lateral)} + Z_{0(xfrm)} + L1 * Z_{0(line1)})}{Z_{0(source)} + Z_{0(source)} + Z_{0(xfrm)} + L1 * Z_{0(line1)}} + \eta * L2 * Z_{0(line2)} \quad \text{Eq. 40}$$

Equations 28-37 can be used to calculate the operating quantities that would be measured by Relays A and B, with the exception of Equation 36, which is used to calculate the zero-sequence voltage that would be measured by Relay A. This equation is updated as shown below in Equation 41.

$$3V_0 = \frac{3I_f}{\gamma}\left(\frac{Z_2}{Z_2 + Z_0 + 3R_F}\right)$$

$$\left(\frac{Z_{S0}}{Z_{0(source)} + Z_{0(lateral)} + Z_{0(xfrm)} + L1 * Z_{0(line1)}}\right)Z_{0(xfrm)} \quad \text{Eq. 41}$$

The use of an additional ground source at the PCC can reduce the zero-sequence impedance behind Relay A. As a result, the zero-sequence voltage that would be measured by Relay A for a ground fault is low, regardless of the fault current. Accordingly, the zero-sequence voltage may not be the preferred operating quantity. The fault currents are comparable to those supplied from the utility source rather than what is supplied by the DER since the ground connection ultimately sources zero-sequence current from the utility positive sequence source. Accordingly, a 51G element may provide better ground fault protection on Relay A, which can be coordinated on the LG TNIL plane with the 51G element on Relay B. While TCC curves are normally used to coordinate two current-based protection elements, the TNIL plane-based coordination is useful since Relay A and Relay B may measure differing ground current. The 51G element on Relay B would operate on the total fault zero-sequence current, where the 51G element on Relay A would observe a fraction of this zero-sequence current. This is illustrated in FIGS. 13 and 14.

Equation 42 and Equation 43 show the calculation of the zero-sequence current seen by Relay A for topology A and topology B models, respectively. These are based on the 3I0 value calculated in Equation 31, which is the total fault zero-sequence current and is also the operating quantity for the 51G element on Relay B.

$$3I_{0A} = 3I_0\left(\frac{Z_{S0}}{Z_{S0} + Z_{TL0} + Z_{T0}}\right) \quad \text{Eq. 42}$$

$$3I_{0A} = 3I_0\left(\frac{Z_{S0}}{Z_{S0} + Z_{TL0} + Z_{T0} + L1 * Z_{L10}}\right) \quad \text{Eq. 43}$$

Fuses on lateral may also be coordinated with the PCC relay for faults on the lateral feeder. In most distribution systems, when fuses are used to protect a lateral feeder, these fuses are generally sized to coordinate with line reclosers in most cases. Fuses use phase current as the operating quantity, and hence the formulas used for $I_f$ calculation in the previous sections can be used, for all types of faults. While a characteristic equation for the time of operation is usually not available for fuses, the TCC curve of a fuse can be converted to a set of data points of current and time of operation. Using the $I_f$ equation, the operating current is calculated for the fuse and the time of operation can be calculated approximately by performing an interpolation based on the data points obtained from the TCC curve. To maintain accuracy, linear interpolation can be performed between two data points closest to the operating current ($\forall 0 \le m \le 1$). Alternatively, inverse square curve fitting can also be performed to obtain a characteristic expression for the time of operation of the fuse as a function of current.

Figure 15:
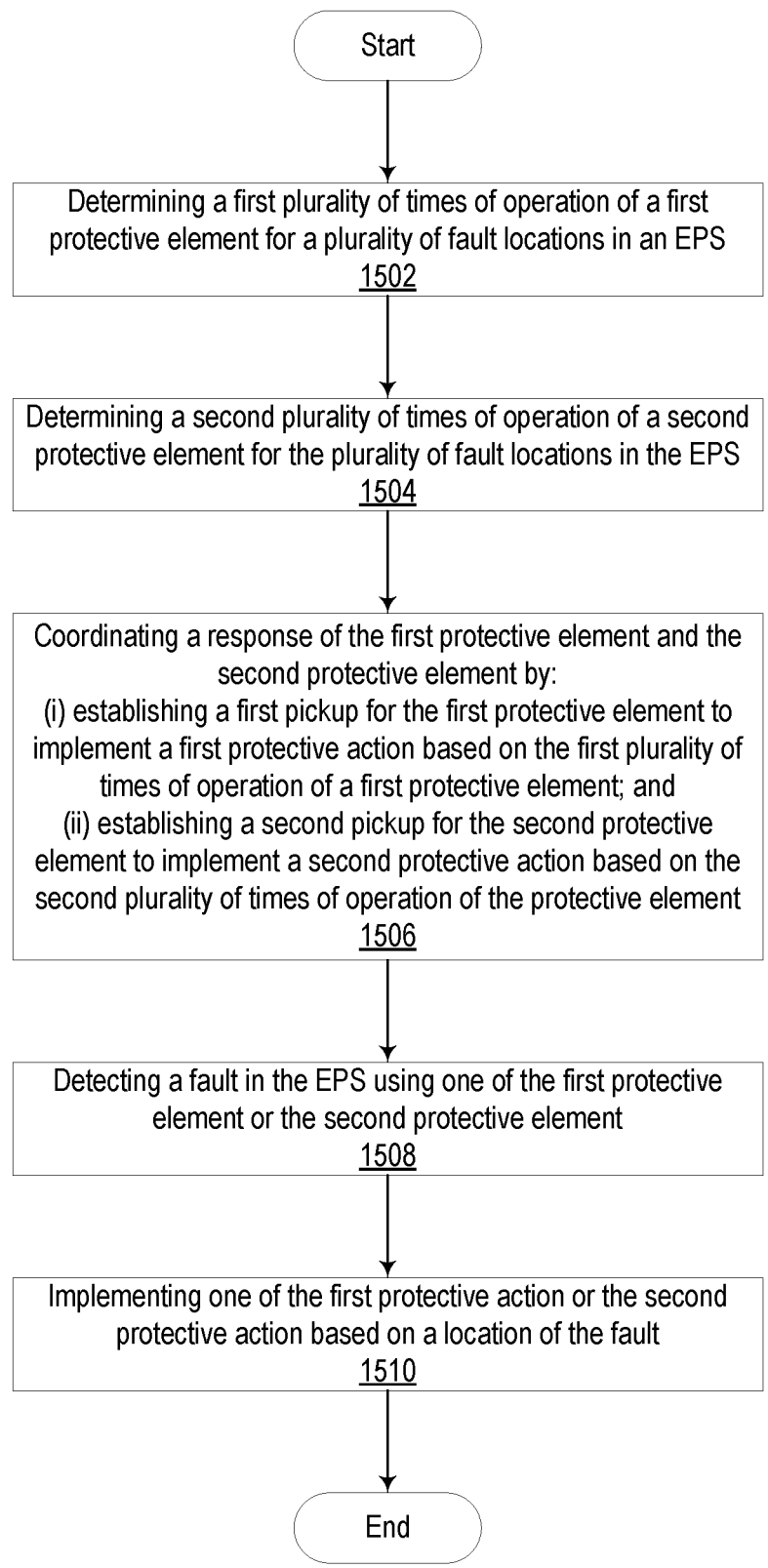
FIG. 15 illustrates a method for coordinating protective elements in an EPS consistent with embodiments of the present disclosure.

FIG. 15 illustrates a method for coordinating protective elements in an EPS consistent with embodiments of the present disclosure. At 1502 a first plurality of times of operation of a first protective element for a plurality of fault locations in the EPS may be determined. Determination of the first plurality of times of operation of the first protective element for a plurality of fault locations may include generating a model for the EPS and using the model to calculate electrical parameters for a plurality of fault locations. In some embodiments, a plot of the TNIL characteristics may be generated, similar to the plots illustrated in FIGS. 2-6.

At 1504 a second plurality of times of operation of a second protective element for a plurality of fault locations in the EPS may be determined. The same techniques used to determine the first plurality of times of operation of the first protective element for a plurality of fault locations in the EPS may be used to determine the second plurality of times of operation of a second protective element for a plurality of fault locations in the EPS. In some embodiments, the first protective element and the second protective element may both be comprised within a single relay, while in other embodiments, the first protective element and the second protective element may be disposed in separate relays.

At 1506, a response of the first protective element and the second element may be coordinated. Coordinating the response may include establishing a first pickup for the first protective element to implement a first protective action based on the first plurality of times of operation of a first protective element; and establishing a second pickup for the second protective element to implement a second protective action based on the second plurality of times of operation of the protective element. Plots of the TNIL characteristics may facilitate coordination of the response of the first protective element and the second protective element. In various embodiments, more than two protective elements may be coordinated.

At 1508, a fault in the EPS using one of the first protective element or the second protective element may be detected.

A variety of types of faults may be detected (e.g., three-phase (3P), phase-to-phase (LL), single-phase-to-ground (1LG), and phase-to-phase-to-ground (LLG)). The first protective element and the second protective element may comprise phase, ground, and negative sequence-based elements that exhibit different characteristics that may be used to balance speed, sensitivity, and selectivity.

At 1510, one of the first protective action and the second protective action may be implemented based on the location of the fault. The coordination of the first protective element and the second protective element may involve restraining protective actions that are either outside of a zone of protection or that can be cleared by protective actions that impact a smaller portion of the EPS.

Figure 16:
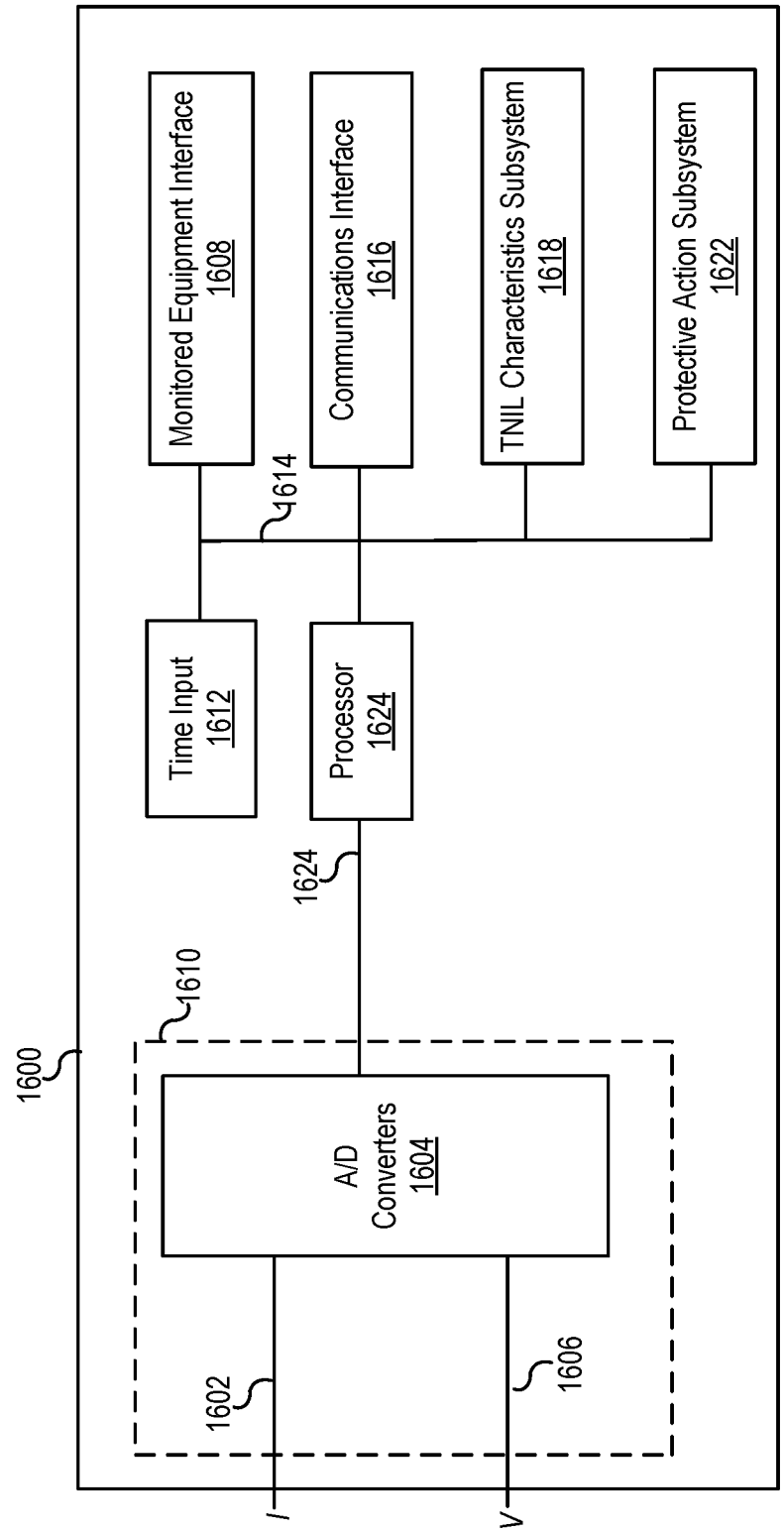
FIG. 16 illustrates a simplified block diagram of a system for coordinating protective elements in an EPS consistent with embodiments of the present disclosure.

FIG. 16 illustrates a simplified block diagram of a system 1600 for coordinating protective elements in an EPS consistent with embodiments of the present disclosure. System 1600 may be implemented using hardware, software, firmware, and/or any combination thereof. In some embodiments, system 1600 may be embodied as a protective relay, intelligent electronic device (IED), or other type of device. Certain components or functions described herein may be associated with other devices or performed by other devices. The specifically illustrated configuration is merely representative of one embodiment consistent with the present disclosure.

System 1600 includes a communications interface 1616 to communicate with relays, IEDs, and/or other devices. In certain embodiments, the communications interface 1616 may facilitate direct communication or communicate with systems over a communications network. System 1600 may further include a time input 1612, which may be used to receive a time signal (e.g., a common time reference) allowing system 1600 to apply a time-stamp to acquired samples. In certain embodiments, a common time reference may be received via communications interface 1616, and accordingly, a separate time input may not be required for time-stamping and/or synchronization operations. One such embodiment may employ the IEEE 1588 protocol. A monitored equipment interface 1608 may receive status information from, and issue control instructions or protective actions to, a piece of monitored equipment (e.g., a circuit breaker, conductor, transformer, or the like).

Processor 1624 processes communications received via communications interface 1616, time input 1612, and/or monitored equipment interface 1608. Processor 1624 may operate using any number of processing rates and architectures. Processor 1624 may perform various algorithms and calculations described herein. Processor 1624 may be embodied as a general-purpose integrated circuit, an application-specific integrated circuit, a field-programmable gate array, and/or any other suitable programmable logic device. A data bus 1614 may provide connection between various components of system 1600.

System 1600 may include a sensor component 1610. In the illustrated embodiment, sensor component 1610 may receive current measurements 1602 and/or voltage measurements 1606. The sensor component 1610 may comprise A/D converters 1604 that sample and/or digitize filtered waveforms to form corresponding digitized current and voltage signals. Current measurements 1602 and/or voltage measurements 1606 may include separate signals from each phase of a three-phase electric power system. A/D converters 1604 may be connected to processor 1624 by way of data bus 1624, through which digitized representations of current and voltage signals may be transmitted.

A protective action subsystem 1622 may implement a protective action based on various conditions monitored by system 1600. In various embodiments, a protective action may include tripping a breaker, selectively isolating or disconnecting a portion of the electric power system, etc. Protective action subsystem 1622 may coordinate protective actions with other devices in communication with system 1600.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to coordinate protective elements in an electric power system (EPS), comprising:
a Time vs Normalized Impedance Length (TNIL) subsystem configured to:
determine a first plurality of times of operation of a first protective element for a plurality of fault locations in the EPS;
determine a second plurality of times of operation of a second protective element for the plurality of fault locations in the EPS;
a protective action subsystem to coordinate a response of the first protective element and the second protective element and to:
establish a first pickup for the first protective element to implement a first protective action based on the first plurality of times of operation of a first protective element;
establish a second pickup for the second protective element to implement a second protective action based on the second plurality of times of operation of the second protective element;
detect a fault in the EPS; and
implementing one of the first protective action and the second protective action based on one of the first pickup and the second pickup.

2. The system of claim 1, wherein a voltage-element based point of common coupling relay comprises at least one of the first protective element and the second protective element.

3. The system of claim 1, wherein the first protective element comprises an Inverse Time-Overcurrent Element and the second protective element comprises an Inverse Voltage Element.

4. The system of claim 3, wherein the protective action subsystem is further configured to establish selective tripping at a point of common coupling to isolate a distributed energy resource (DER) to protect one of the EPS or the DER.

5. The system of claim 3, wherein the protective action subsystem is further configured to restrain to avoid disconnecting a distributed energy resource to keep the DER online for continued service.

6. The system of claim 1, wherein a first protective relay comprises the first protective element and a second protective relay comprises the second protective element.

7. The system of claim 1, wherein the protective action subsystem is further configured to coordinate the response of the first protective element and the second protective element with a third protective element.

8. The system of claim 1 wherein the Time vs Normalized Impedance Length (TNIL) subsystem is further configured to generate a plot of the first plurality of times of operation of the first protective element for the plurality of fault locations.

9. The system of claim 1, wherein one of the first protective element or the second protective element comprises an Inverse Minimum Line to Neutral Time-Undervoltage Element.

10. The system of claim 1, wherein one of the first protective element or the second protective element comprises an Inverse Ground Time-Overvoltage Element.

11. A method for coordinating protective elements in an electric power system (EPS), the method comprising:
    determining a first plurality of times of operation of a first protective element for a plurality of fault locations in the EPS;
    determining a second plurality of times of operation of a second protective element for the plurality of fault locations in the EPS;
    coordinating a response of the first protective element and the second protective element by:
        establishing a first pickup for the first protective element to implement a first protective action based on the first plurality of times of operation of a first protective element; and
        establishing a second pickup for the second protective element to implement a second protective action based on the second plurality of times of operation of the second protective element;
    detecting a fault in the EPS; and
    implementing one of the first protective action and the second protective action based on one of the first pickup and the second pickup.

12. The method of claim 11, wherein a voltage-element based point of common coupling relay comprises at least one of the first protective or the second protective element.

13. The method of claim 11, wherein the first protective element comprises a Time-Overcurrent Element and the second protective element comprises an Inverse Voltage Element.

14. The method of claim 13, wherein coordinating the response of the first protective element and the second protective element comprises establishing selective tripping at a point of common coupling to isolate a distributed energy resource.

15. The method of claim 13, wherein coordinating the response of the first protective element and the second protective element comprises restraining to avoid disconnecting a distributed energy resource.

16. The method of claim 11, wherein a first protective relay comprises the first protective element and a second protective relay comprises the second protective element.

17. The method of claim 11, further comprising coordinating the response of the first protective element and the second protective element with a third protective element.

18. The method of claim 11, further comprising generating a plot of the first plurality of times of operation of the first protective element for the plurality of fault locations.

19. The method of claim 11, wherein one of the first protective element or the second protective element comprises an Inverse Minimum Line to Neutral Time-Undervoltage Element.

20. The method of claim 11, wherein one of the first protective element or the second protective element comprises an Inverse Ground Time-Overvoltage Element.

* * * * *